US012494586B2

(12) United States Patent
Yong et al.

(10) Patent No.: US 12,494,586 B2
(45) Date of Patent: Dec. 9, 2025

(54) INTEGRATED MULTIPLE-ANTENNA CONFIGURATION AND ANTENNA MODULE

(71) Applicant: Shanghai Amphenol Airwave Communication Electronics Co., Ltd, Shanghai (CN)

(72) Inventors: Checkchin Yong, Shanghai (CN); Hongliang Gu, Shanghai (CN); Jin Shang, Shanghai (CN)

(73) Assignee: Shanghal Amphenol Airwave Communication Electronics Co., Ltd, Shanghai (CN)

( * ) Notice: Subject to any disclaimer, the term of this patent is extended or adjusted under 35 U.S.C. 154(b) by 227 days.

(21) Appl. No.: 18/020,951

(22) PCT Filed: Mar. 4, 2021

(86) PCT No.: PCT/CN2021/079094

§ 371 (c)(1),
(2) Date: Aug. 2, 2023

(87) PCT Pub. No.: WO2022/033018

PCT Pub. Date: Feb. 17, 2022

(65) Prior Publication Data

US 2024/0275059 A1 Aug. 15, 2024

(30) Foreign Application Priority Data

Aug. 14, 2020 (CN) ......................... 202010819029.8

(51) Int. Cl.
*H01Q 13/10* (2006.01)
*H01Q 5/314* (2015.01)
(Continued)

(52) U.S. Cl.
CPC ............. *H01Q 13/10* (2013.01); *H01Q 5/314* (2015.01); *H01Q 9/16* (2013.01); *H01Q 21/24* (2013.01)

(58) Field of Classification Search
CPC .......... H01Q 13/10; H01Q 5/314; H01Q 9/16; H01Q 21/24
See application file for complete search history.

(56) References Cited

U.S. PATENT DOCUMENTS

2004/0104859 A1* 6/2004 Lo ............................ H01Q 5/42 343/826
2014/0071005 A1* 3/2014 Wang ..................... H01Q 1/243 343/725

(Continued)

FOREIGN PATENT DOCUMENTS

CN 101647153 A 2/2010
CN 107925430 A 4/2018

(Continued)

*Primary Examiner* — Dieu Hien T Duong
(74) *Attorney, Agent, or Firm* — IPRTOP LLC

(57) ABSTRACT

A highly integrated multi-antenna configuration and an antenna module containing the same are provided; the highly integrated multi-antenna configuration includes: a metal ground, a radiation slot cut out of the metal ground, and an excitation unit; the excitation unit includes a slot excitation source and slot excitation components, and the slot excitation source is loaded on the slot excitation components to excite the radiation slot, thereby forming a slot antenna. A first dipole antenna is set in the radiation slot, and extends along a direction that is at an angle of between −10° and 10° with a long side of the radiation slot. A plurality of antenna configurations can also be formed based on the same slot, and the corresponding antenna traces can function as parts of a distance sensor to improve the integration of the antenna configuration.

17 Claims, 18 Drawing Sheets

(51) Int. Cl.
*H01Q 9/16* (2006.01)
*H01Q 21/24* (2006.01)

(56) References Cited

U.S. PATENT DOCUMENTS

| | | | | |
|---|---|---|---|---|
| 2015/0097745 | A1 | 4/2015 | Chou et al. | |
| 2017/0093050 | A1 * | 3/2017 | Suh | H04B 1/56 |

FOREIGN PATENT DOCUMENTS

| | | | |
|---|---|---|---|
| CN | 109768387 | A | 5/2019 |
| CN | 111816995 | A | 10/2020 |

* cited by examiner

INTEGRATED MULTIPLE-ANTENNA CONFIGURATION AND ANTENNA MODULE

FIELD OF THE INVENTION

The present disclosure relates to antenna design, and in particular, relates to a highly integrated multi-antenna configuration and an antenna module containing the highly integrated multi-antenna configuration.

BACKGROUND OF THE INVENTION

With the development of the information age, wireless communication is playing an increasingly important role in various electronic products. As the carrier for transmission and reception of wireless electromagnetic waves, antennas play an irreplaceable role in wireless communication. The advent of the 5G communication and IoT era brings new challenges to the number of antennas and working frequency range of electronic devices, and more antennas and more antenna working frequency bands will be utilized in 5G communication systems. Currently, the pursuit of high integration and miniaturization of electronic products has led to an increasingly smaller leeway for antenna design. How to place more antennas in a limited space and keep the antennas from interfering with each other is a challenge faced by antenna designers.

SUMMARY OF THE INVENTION

The present disclosure provides a highly integrated multi-antenna configuration, comprising:

a metal ground; a radiation slot cut out of a surface of the metal ground; and an excitation unit; wherein the excitation unit comprises a slot excitation source and slot excitation components, and the slot excitation source is loaded on the slot excitation components to excite the radiation slot, thereby forming a slot antenna;

a first dipole antenna is disposed in the radiation slot, wherein the first dipole antenna comprises a first dipole excitation source and a first antenna trace, and the first antenna trace extends along a direction that is at an angle of between −10° and 10° with a long side of the radiation slot.

Optionally, the metal ground comprises a PCB board, an FPC board, a metal housing, or a conductive metal coating.

Optionally, the excitation unit is excited in a direct excitation mode or a coupled excitation mode.

Optionally, the excitation unit is excited by coupled feeding through a dipole unit, and the dipole unit comprises a Balun structure.

Optionally, the excitation unit is excited in the direct excitation mode, the slot excitation components extend over the radiation slot in a direction parallel to a narrow side of the radiation slot, and ends of slot excitation components are connected to the metal ground, both the slot excitation source and the first dipole antenna are symmetrical with respect to a line connecting center points of two narrow sides of the radiation slot, respectively; or the excitation unit is excited in the coupled excitation mode through a dipole unit, both the dipole unit and the first dipole antenna are symmetrical with respect to a line connecting center points of two narrow sides of the radiation slot, respectively.

Optionally, the first dipole antenna is excited in the direct excitation mode, and the first dipole excitation source is directly loaded on the first antenna trace.

Optionally, the first dipole antenna is excited in a coupled excitation mode, and the first dipole antenna further comprises a first dipole excitation component connected to the first dipole excitation source, the first dipole excitation source is loaded on the first dipole excitation component, and the radiation slot asserts a binding effect on surrounding electromagnetic fields, which enables the first dipole excitation component to perform coupled excitation on the first antenna trace so that the first antenna trace operates in a dipole antenna mode.

Optionally, the slot excitation components and the first antenna trace are located in different spatial layers, and their orthographic projections onto one of the spatial layers at least partially overlap.

Optionally, the excitation unit is excited in a coupled excitation mode, the slot excitation components comprise a first slot excitation component and a second slot excitation component connected to the slot excitation source, the first slot excitation component and the second slot excitation component are also located in different spatial layers, and the slot excitation source is loaded on the first slot excitation component, which enables the first slot excitation component to performed coupled excitation on the second slot excitation component.

Optionally, the radiation slot is a closed slot whose four sides are enclosed by the metal ground, or the radiation slot is an open slot partially enclosed by the metal ground, and has an opening located on a narrow side of the radiation slot.

Optionally, the highly integrated multi-antenna configuration further comprises a second dipole antenna provided in the radiation slot, wherein the second dipole antenna comprises a second dipole excitation source and a second antenna trace, and the second antenna trace extends in a direction that is at an angle of between −10° and 10° with the long side of the radiation slot.

Optionally, the excitation unit is excited in a direct excitation mode, the slot excitation components extend over the radiation slot in a direction parallel to a narrow side of the radiation slot, and ends of slot excitation components are connected to the metal ground; the slot excitation source, the first dipole antenna, and the second dipole antenna are all symmetrical with respect to a line connecting center points of two narrow sides of the radiation slot; or the excitation unit is excited in a coupled excitation mode through a dipole unit, and the dipole unit, the first dipole antenna, and the second dipole antenna are all symmetrical with respect to the line connecting the center points of the two narrow sides of the radiation slot.

Optionally, the second dipole antenna is excited in the coupled excitation mode, the second dipole antenna further comprises a second dipole excitation component connected to the second dipole excitation source, the second dipole excitation source is loaded on the second dipole excitation component, and the radiation slot asserts a binding effect on surrounding electromagnetic fields, which enables the second dipole excitation component to perform coupled excitation on the second antenna trace so that the second antenna trace operates in a dipole antenna mode.

Optionally, the first antenna trace and/or the second antenna trace act as one or more sensing branches of a distance sensor.

Optionally, the distance sensor is connected to the slot excitation components, or the first antenna trace, or the second antenna trace.

Optionally, through a high frequency filtering structure, the distance sensor is connected to the slot excitation components, or the first antenna trace, or the second antenna trace.

Optionally, the slot excitation source is a WWAN excitation source, a MIMO excitation source, a WLAN excitation source, or a Sub 6G excitation source, the first dipole excitation source is a MIMO excitation source, a WLAN excitation source, or a Sub 6G excitation source, and the second dipole excitation source is a MIMO excitation source, a WLAN excitation source, or a Sub 6G excitation source.

The present disclosure further provides an antenna module, and the antenna module comprises two or more highly integrated multi-antenna configurations, each being the highly integrated multi-antenna configuration as described above.

As described above, in the highly integrated multi-antenna configuration and the antenna module of the present disclosure, a plurality of antennas is formed based on the same slot (e.g., the slot antenna and the first dipole antenna), which can be applied to antenna designs such as 2G, 3G, 4G, 5G, BT, Wi-Fi, Navigation, and UWB, depending on the size of the radiation slot; in actual implementations, antenna traces can also be integrated with a distance sensor to achieve dual functionality or spatial multiplexing, thereby further improving the integration of the antenna system. Meanwhile, by controlling the electric field generated by the first dipole to be orthogonal to the electric field generated by the slot antenna, a high isolation between the two antennas can be achieved, thereby increasing the isolation between the two antennas while maintaining the antenna integration.

BRIEF DESCRIPTION OF THE DRAWINGS

FIGS. 11 to 15 show a two-antenna system based on a highly integrated multiple antenna configuration of the present disclosure, wherein a first dipole antenna is excited in a coupled excitation mode, wherein FIG. 12 is an enlarged view of the dashed box A in FIG. 15 and surrounding components, showing a spatial layout of two antennas in particular.

REFERENCE NUMERALS

Figure 1:
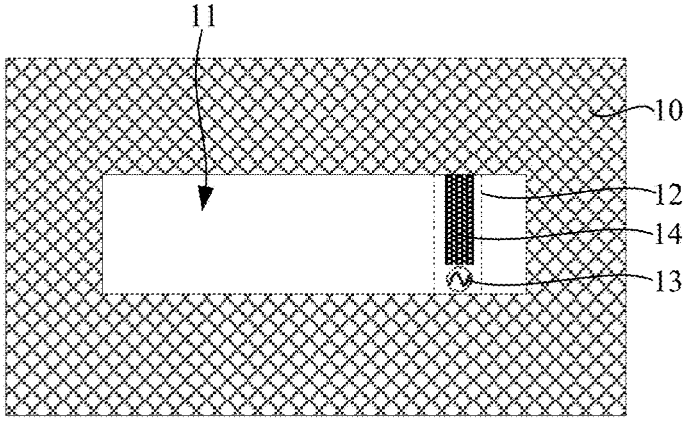
FIG. 1 (prior art)
FIGS. 1 to 4 are schematic diagrams showing structures of common slot antennas.

10 Metal ground
11 Radiation slot
12 Excitation unit
13 Slot excitation source
14 Slot excitation components
140 First slot excitation component
141 Second slot excitation component
15 First dipole antenna
16 First dipole excitation source
17 First dipole excitation component
18 First antenna trace
19 Second dipole antenna
20 Second dipole excitation source
21 Second dipole excitation component
22 Second antenna trace
24 Distance sensor control circuit
25 Dielectric insulating layer
26 Metal hinge
27 Upper half
28 Lower half
29 Electrical connection structure
30 Capacitor
31 Inductor
32 Antenna trace
33 Distance sensor signal line
34 First multi-antenna configuration
35 Second multi-antenna configuration
36 Third multi-antenna configuration
37 Antenna ground A Dashed box

DETAILED DESCRIPTION

The present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Figure 2:
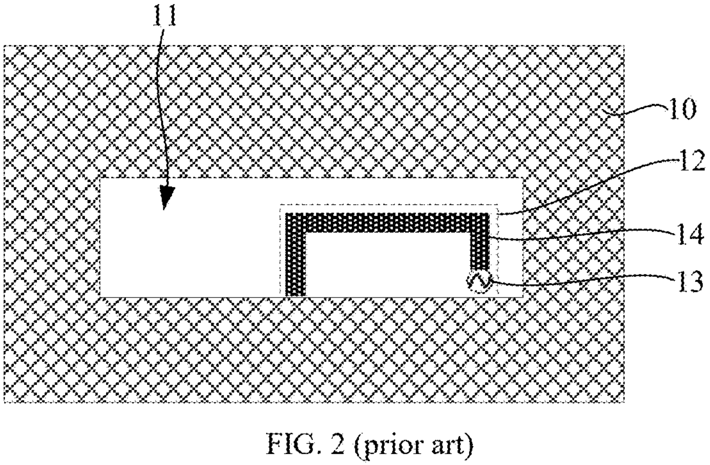
FIG. 2 (prior art)
Figure 3:
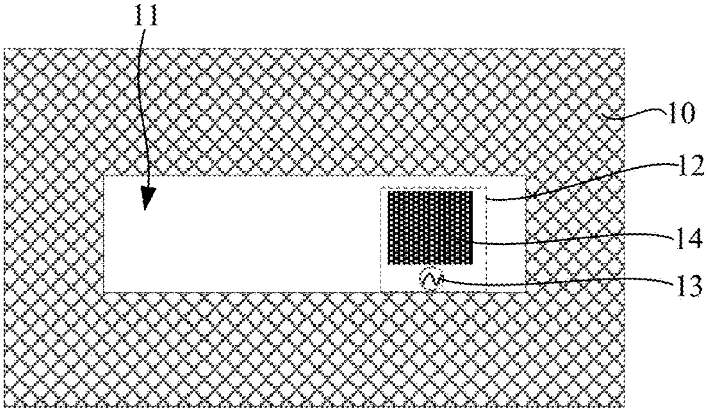
FIG. 3 (prior art)
Figure 4:
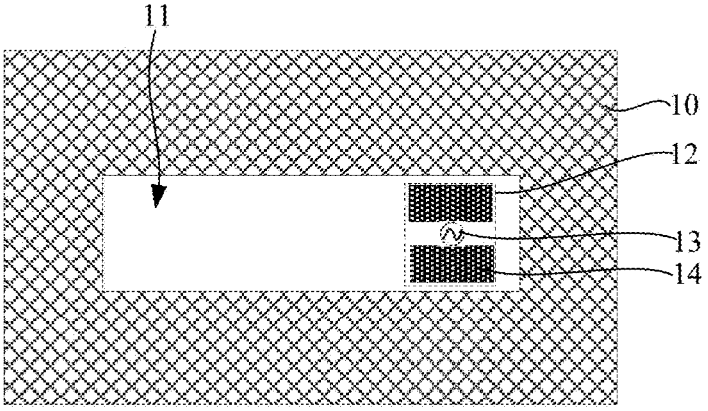
FIG. 4 (prior art)

Refer to FIGS. 1-41. It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated. The radiation slot of the slot antenna of the present disclosure is substantially rectangular, but long and/or short sides of the radiation slot may have some small bumps and/or recesses, which does not change the fact that the long sides of the radiation slot extend horizontally in general, and that the short sides extend vertically in general. Also, long and/or short sides of the antenna routing wire(s) may have some small bumps and/or recesses, which does not change the fact that the long sides of the antenna trace(s) extend horizontally in general, and that the short sides extend vertically in general. Slot antennas are antennas formed by cutting slots out of waveguides, metal plates, or resonant cavities, where electromagnetic waves are radiated through the slots to the external space. They have low profiles, can conform to prescribed shapes easily, and require only simple processing, and therefore they are widely applied in various types of electronic products. FIG. 1 to FIG. 4 show several common forms of slot antennas; their ways of feeding include direct feeding (as shown in FIG. 1), ring feeding (as shown in FIG. 2), monopole coupled feeding (as shown in FIG. 3), dipole coupled feeding (as shown in FIG. 4). The advent of highly integrated and miniaturized electronic products puts the integration degree of antennas to a severe test.

Thus, the present disclosure proposes an antenna system where a highly integrated multi-antenna configuration is formed based on a slot of a slot antenna, in which multiple antennas are placed in a narrow slot and the isolation between the multiple antennas is relatively good, thereby improving the integration of the antennas.

Figure 7:
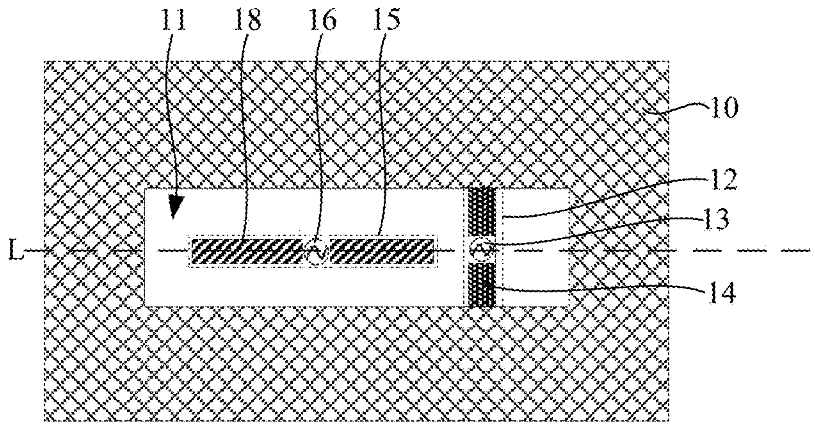
FIGS. 7 to 10 show a two-antenna system based on a highly integrated multiple antenna configuration of the present disclosure, wherein a first dipole antenna is excited in a direct excitation mode.

Specifically, as shown in FIG. 7, the highly integrated multi-antenna configuration of the present disclosure includes:

a metal ground 10; a radiation slot 11 cut out of a surface of the metal ground 10; and an excitation unit 12; wherein the excitation unit 12 includes a slot excitation source 13 and one or more slot excitation components 14, and the slot excitation source 13 is loaded on the slot excitation components 14 to excite the radiation slot 11, thereby forming a slot antenna.

A first dipole antenna 15 is disposed in the radiation slot 11. The first dipole antenna 15 includes a first dipole excitation source 16 and a first antenna trace 18; the first antenna trace 18 extends along a direction that is at an angle of between −10° and 10° with a long side of the radiation slot 11. It should be noted that the above angle range includes the two endpoints −10° and 10°. The above configuration helps achieve a degree of isolation between the first dipole antenna 15 and the slot antenna that meets operating specifications.

By forming multiple antennas (e.g., the slot antenna and the first dipole antenna) based on the same radiation slot, depending on the size of the radiation slot, the present disclosure can be applied to antenna designs such as 2G, 3G, 4G, 5G, BT, Wi-Fi, Navigation, and UWB, to improve integration of the antennas; also, the electric field generated by the first dipole antenna is orthogonal to the electric field generated by the radiation slot, which achieves a high degree of isolation between the two antennas.

Figure 18:
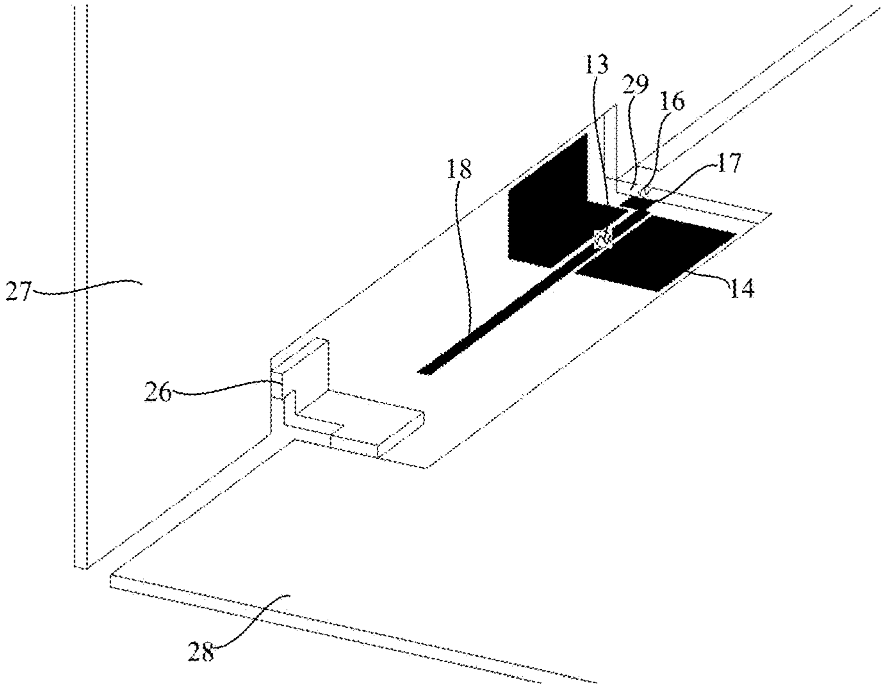
FIG. 18 shows a schematic structural diagram of a two-antenna system based on a highly integrated multi-antenna configuration of Embodiment 1 of the present disclosure.

As an example, the metal ground 10 can be of any form suitable for forming a slot antenna; for example, the metal ground 10 is a PCB board, a FPC board, a metal housing, or a conductive metal coating, etc., as long as it is able to conduct electricity. The metal ground 10 may be a one-piece molded metal ground. It can also be a metal ground that is fixed in a removable manner; for example, a reversible electronic device may have a metal ground 10 formed in its hinge area, wherein the metal ground 10 includes a radiation slot 11 (as shown in FIG. 18), which is further formed by a metal hinge 26, an upper half 27 and a lower half 28 of the device, and an electrical connection structure 29 electrically connecting the upper and lower halves 26-27.

Figure 5:
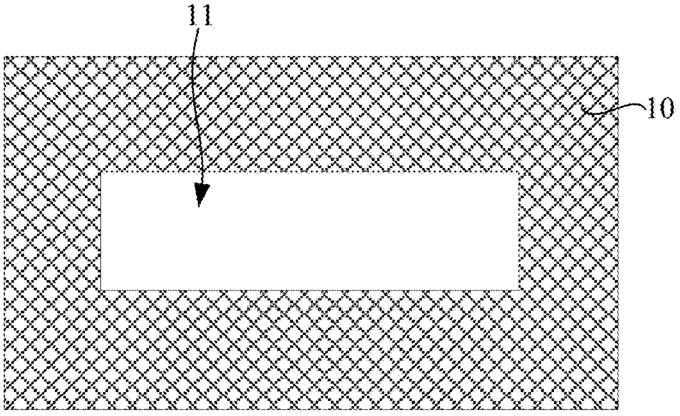
FIG. 5 and FIG. 6 are schematic diagrams showing different layouts of a radiation slot on a metal ground in a highly integrated multiple antenna configuration of the present disclosure.
Figure 6:
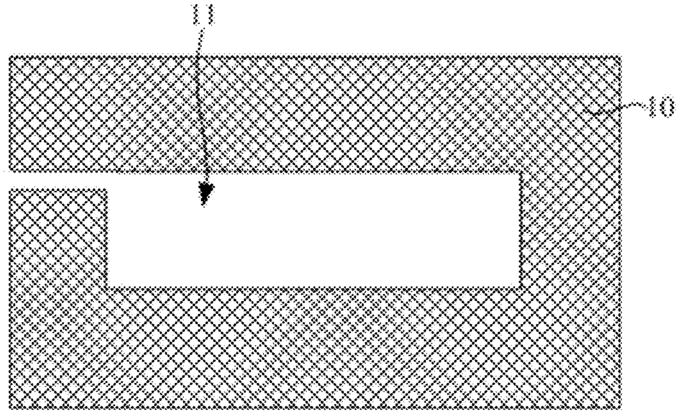

As shown in FIG. 5 and FIG. 6, as examples, the radiation slot 11 is a closed slot whose four sides are enclosed by the metal ground 10 (as shown in FIG. 5), or the radiation slot 11 is an open slot partially enclosed by the metal ground 10, and has an opening located on a narrow side of the radiation slot 11 (as shown in FIG. 6).

As an example, the slot excitation source 13 may be a WWAN excitation source, a MIMO excitation source, a WLAN excitation source, or a Sub 6G excitation source, and the first dipole excitation source 16 may be a MIMO excitation source, a WLAN excitation source, or a Sub 6G excitation source.

Figure 8:
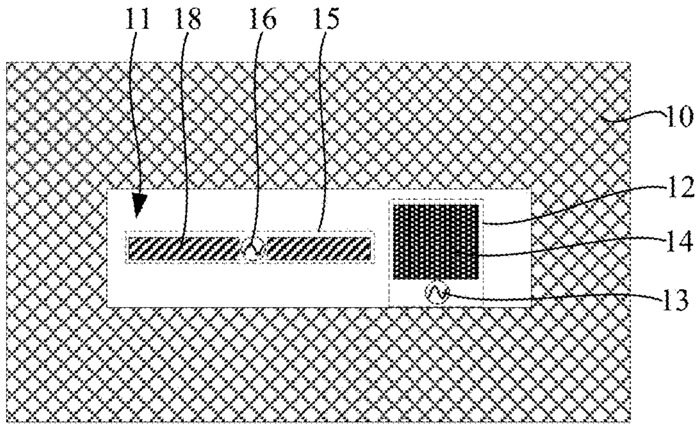
Figure 9:
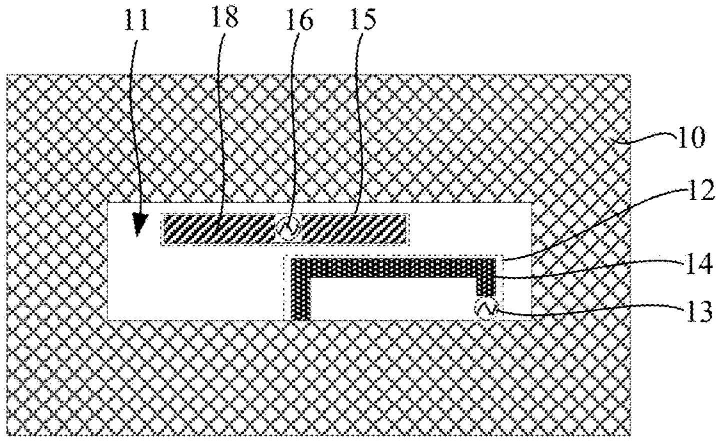
Figure 10:
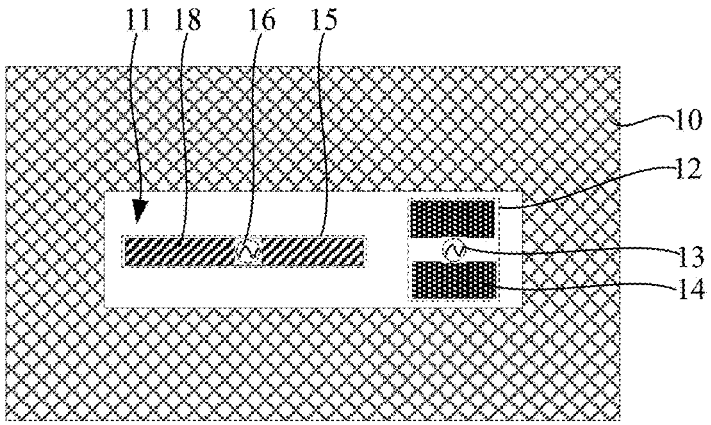

Referring to FIGS. 7 to 10, as an example, the excitation unit 12 of the slot antenna may be excited in a direct excitation mode; for example, the excitation unit 12 in FIG. 7 is excited in a direct-feeding excitation mode, and the excitation unit 12 in FIG. 9 is excited in a ring-feeding excitation mode. The excitation unit 12 of the slot antenna may also be excited in a coupled excitation mode; for example, the excitation unit 12 in FIG. 8 is excited in a monopole-coupled-feeding excitation mode, and the excitation unit 12 in FIG. 10 is excited in a dipole-coupled-feeding excitation mode. Preferably, when the excitation unit 12 is excited in the direct-feeding excitation mode, the slot excitation components 14 extend over the radiation slot 11 in a direction parallel to a narrow side of the radiation slot 11, ends of the slot excitation components 14 are connected to the metal ground 10, and the slot excitation source 13 is disposed in the middle of the slot excitation components 14 (for example, between two slot excitation components as shown in FIG. 7), that is, the slot excitation source 13 is symmetrical with respect to a line connecting center points of two narrow sides of the radiation slot 11 (hereinafter, line L), in which case the first dipole antenna 15 may also be symmetrical with respect to the line L. Because the slot excitation source 13 is located in the line L (i.e., symmetrical with respect to the line L), the electric field excited by the radiation slot 11 is also symmetrical with respect to the line L, which means the electric field is roughly symmetrical with respect to the radiation slot 11. The same applies to the first dipole antenna 15, which is also located in the line L, and the electric field excited by which is also symmetrical with respect to the line L but orthogonal to the one generated by the radiation slot 11. At this time, coupling between the two antennas (i.e., the slot antenna and the first dipole antenna 15) are minimized, thereby achieving a high degree of isolation between the two. In addition, coaxial feeding lines of the slot excitation source 13 can be wired along the slot excitation components 14 to better ensure an equilibrium state where the two electric fields generated by the two antennas (i.e., the slot antenna and the first dipole antenna 15) are orthogonal to each other. Similarly, when the excitation unit 12 is excited in the coupled excitation mode through a dipole unit, the dipole unit and the first dipole antenna 15 are symmetrical with respect to the line L, respectively, thereby minimizing coupling between the two antennas (i.e., the slot antenna and the first dipole antenna 15), and achieving a high degree of isolation between the two.

As an example, the excitation unit 12 is excited by coupled feeding through a dipole unit, and the dipole unit includes a Balun structure, so as to improve the stability of the antenna system.

Figure 16:
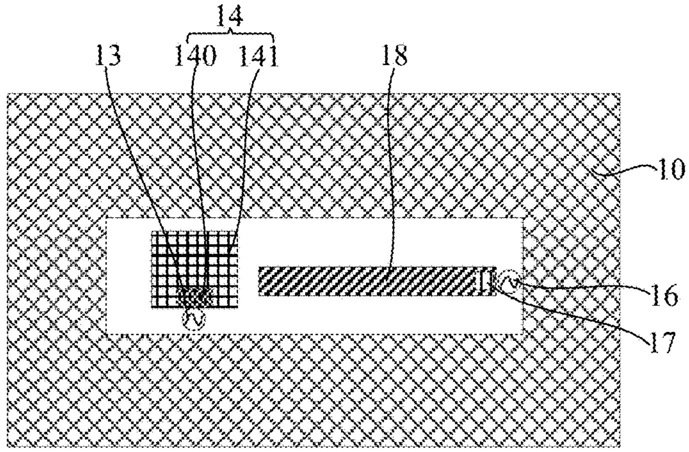
FIG. 16 shows a two-antenna system based on a highly integrated multi-antenna configuration of the present disclosure, wherein a first dipole antenna and a slot antenna are both excited in a coupled excitation mode.

As another example, referring to FIG. 16, the excitation unit (including the slot excitation source 13 and the slot excitation components 14) is excited in the coupled excitation mode, in which case the slot excitation components 14 include a first slot excitation component 140 and a second slot excitation component 141 connected to the slot excitation source 13, the first slot excitation component 140 and the second slot excitation component 141 are located in different spatial layers, and the slot excitation source 13 is loaded on the first slot excitation component 140 so that the first slot excitation component 140 excites the second slot excitation component 141 by coupled excitation and the second slot excitation component 141 further excites the radiation slot 11, thereby forming the slot antenna.

Referring to FIGS. 7 to 10, as an example, the first dipole antenna 15 may be excited in the direct excitation mode, the first dipole antenna 15 includes a first dipole excitation source 16 and a first antenna trace 18, and the first dipole excitation source 16 is loaded directly on the first antenna trace 18, thereby forming the dipole antenna.

Figure 11:
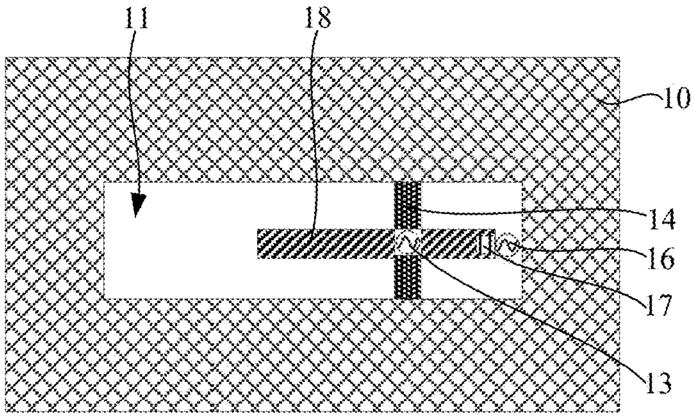
Figure 12:
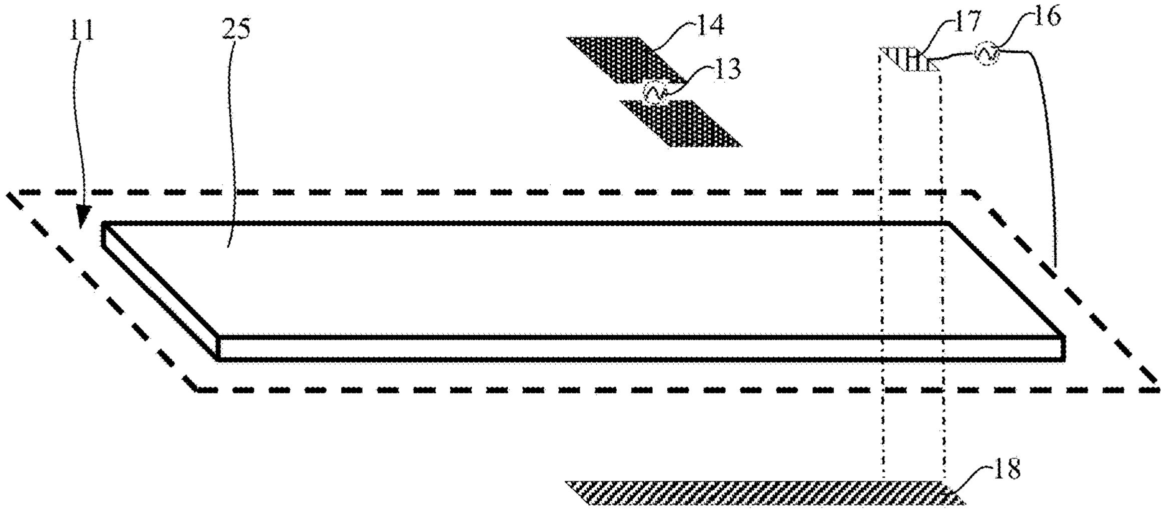
Figure 13:
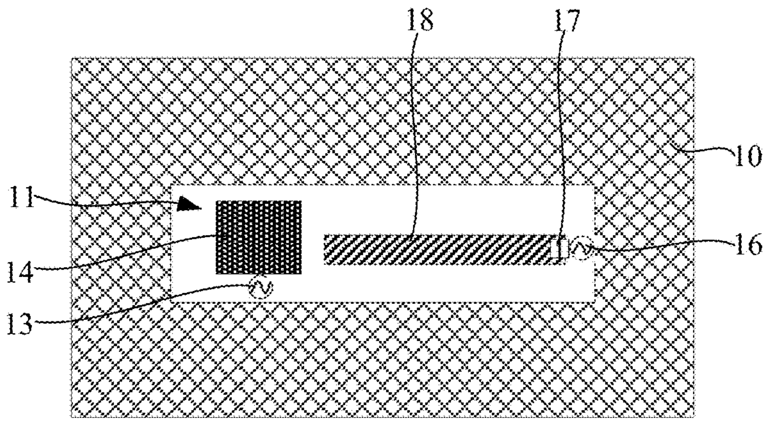
Figure 14:
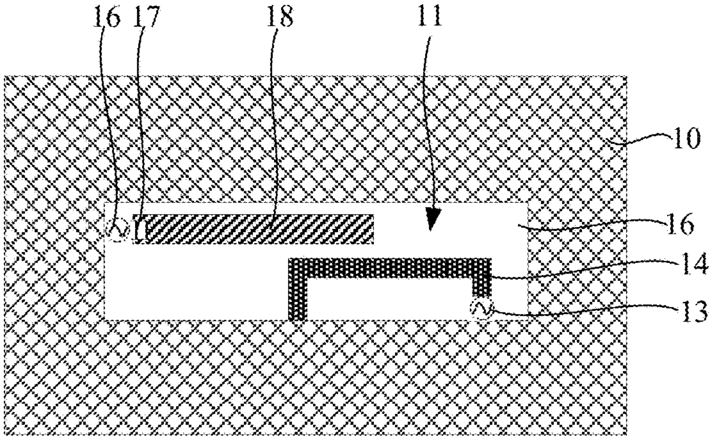
Figure 15:
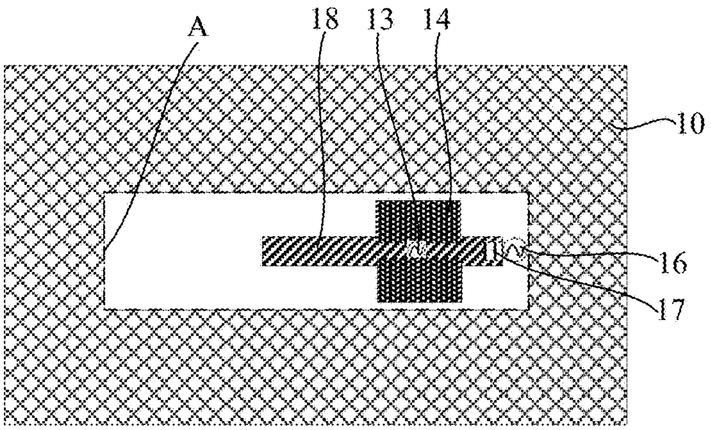

Refer to FIGS. 11 to 15. The first dipole antenna 15 may also be excited in the coupled excitation mode, in which case the first dipole antenna 15 includes the first dipole excitation source 16, a first dipole excitation component 17 connected to the first dipole excitation source 16, and the first antenna trace 18. Shapes, sizes, and locations of the first dipole excitation source 16, the first dipole excitation component 17 and the first antenna trace 18 can be adjusted as long as under the excitation of the first dipole excitation source 16, the first dipole excitation component 17 can perform coupled excitation on the first antenna trace 18. The corresponding working principle is as follows: the first dipole excitation source 16 is loaded on the first dipole excitation component 17, and the radiation slot 11 asserts a binding effect on surrounding electromagnetic fields, which enables the first dipole excitation component 17 to perform coupled excitation on the first antenna trace 18 so that the first antenna trace 18 operates in a dipole antenna mode. As shown in FIG. 12, preferably, orthographic projections of the first dipole excitation component 17 and the first antenna trace 18 at least partially overlap, in which case the first dipole excitation component 17 is more effectively coupled to the first antenna trace 18. The first dipole antenna 15 excited in the coupled excitation mode can have a first antenna trace 18 with an effectively reduced size, and miniaturization of the first dipole antenna 15 can be achieved by adjusting the coupling area between the first antenna trace 18 and the first dipole excitation component 17, and a thickness of a dielectric insulating layer 25 between the two. Referring to FIG. 11, in one example, the first dipole antenna (including the first dipole excitation source 16 and the first dipole excitation component 17) is excited in the coupled excitation mode, and the excitation unit (including the slot excitation source 13 and the slot excitation component 14) is excited in the direct-feeding excitation mode. Referring to FIG. 13, in one example, the first dipole antenna (including the first dipole excitation source 16 and the first dipole excitation component 17) is excited in the coupled excitation mode, and the excitation unit (including the slot excitation source 13 and the slot excitation component 14) is excited in the monopole-coupled-feeding excitation mode. Referring to FIG. 14, in one example, the first dipole antenna (including the first dipole excitation source 16 and the first dipole excitation component 17) is excited in the coupled excitation mode, and the excitation unit (including the slot excitation source 13 and the slot excitation component 14) is excited in the ring-feeding excitation mode. Referring to FIG. 15, in one example, the first dipole antenna (including the first dipole excitation source 16 and the first dipole excitation component 17) is excited in the coupled excitation mode, and the excitation unit (including the slot excitation source 13 and the slot excitation component 14) is excited in the dipole-coupled-feeding excitation mode.

As an example, when the slot excitation components 14 of the excitation unit 12 and the first antenna trace 18 of the first dipole antenna 15 are located in different spatial layers, orthographic projections of the slot excitation components 14 and the first antenna trace 18 at least partially overlap, so that more space in the radiation slot can be reserved for other antennas, allowing further antenna integration. For example, referring to FIG. 11, the excitation unit (including the slot excitation source 13 and the slot excitation component 14) is excited in the direct-feeding excitation mode, the first dipole antenna (including the first dipole excitation source 16 and the first dipole excitation component 17) is excited in the coupled excitation mode, and the orthographic projections of the slot excitation components 14 and the first antenna trace 18 at least partially overlap. Referring to FIG. 15, in one example, the excitation unit (including the slot excitation source 13 and the slot excitation component 14) is excited in the dipole-coupled-feeding mode and the first dipole antenna (including the first dipole excitation source 16 and the first dipole excitation component 17) is excited by coupled excitation, and the orthographic projections of the slot excitation components 14 and the first antenna trace 18 at least partially overlap. There are other possibilities: for example, the excitation unit 12 may be excited by coupled excitation and the first dipole antenna may be excited by direct excitation, and the orthographic projections of the slot excitation components 14 and the first antenna trace 18 at least partially overlap. As long as the slot excitation components 14 and the first antenna trace 18 are located in different spatial layers, they can be so configured that their orthographic projections at least partially overlap.

Note that, as shown in FIG. 12, when antenna components in the present disclosure are located in different spatial layers, a dielectric insulating layer (for example, the dielectric insulating layer 25) is provided between two adjacent layers, so that the antenna components are vertically spaced apart, forming a layered structure.

As an example, referring to FIG. 16, the excitation unit (including the slot excitation source 13 and the slot excitation components 14) and the first dipole antenna (including the first dipole excitation source 16 and the first dipole excitation component 17) are both excited in the coupled excitation mode, in which case the slot excitation components 14 include a first slot excitation component 140 and a second slot excitation component 141 connected to the slot excitation source 13, the first slot excitation component 140 and the second slot excitation component 141 are located in different spatial layers, and the slot excitation source 13 is loaded on the first slot excitation component 140 so that the first slot excitation component 140 excites the second slot excitation component 141 by coupled excitation and the second slot excitation component 141 further excites the radiation slot 11, thereby forming the slot antenna; here, the first dipole antenna includes the first dipole excitation source 16, the first dipole excitation component 17 electrically connected to the first dipole excitation source 16 and the first antenna trace 18, the first dipole excitation component 17 and the first antenna trace 18 are located in different spatial layers, the first dipole excitation source 16 is loaded on the first dipole excitation component 17, and the radiation slot 11 asserts a binding effect on surrounding electromagnetic fields, which enables the first dipole excitation component 17 to perform coupled excitation on the first antenna trace 18 so that the first antenna trace 18 operates in the dipole antenna mode.

Figure 17:
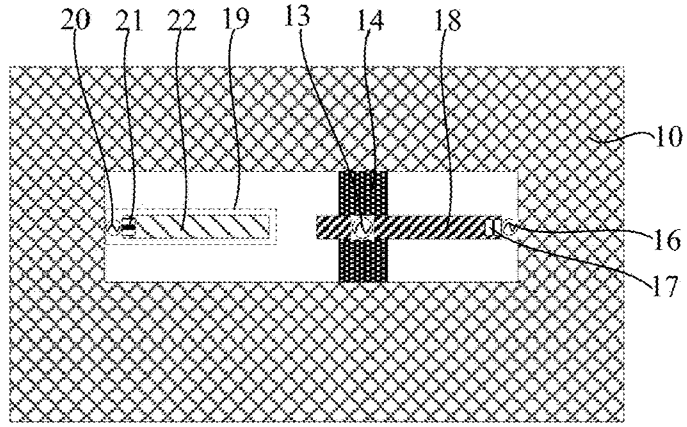
FIG. 17 shows a three-antenna system based on a highly integrated multi-antenna configuration of the present disclosure, wherein a first dipole antenna and a second dipole antenna are excited in a coupled excitation mode, and a slot antenna is excited in a direct excitation mode.

Referring to FIG. 17, as an example, in addition to the slot antenna and the first dipole antenna, the multiple antenna configuration may also include a second dipole antenna 19 provided in the radiation slot 11, wherein the second dipole antenna 19 includes a second dipole excitation source 20 and a second antenna trace 22, wherein the second antenna trace 22 extends along a direction that is at an angle of between −10° and 10° with a long side of the radiation slot 11. It should be noted that the above angle range includes the two endpoints −10° and 10°. The above configuration helps achieve a degree of isolation between the second dipole antenna 19 and the slot antenna that meets operating specifications.

As an example, the second dipole antenna 19 may be excited in the direct excitation mode, the second dipole antenna 19 includes the second dipole excitation source 20 and the second antenna trace 22, and the second dipole excitation source 20 is loaded directly on the second antenna trace 22, thereby forming the dipole antenna.

Referring to FIG. 17, as an example, the second dipole antenna 19 may also be excited in the coupled excitation mode, in which case the second dipole antenna 19 includes the second dipole excitation source 20, a second dipole excitation component 21 connected to the second dipole excitation source 20, and the second antenna trace 22. Shapes, sizes, and locations of the second dipole excitation source 20, the second dipole excitation component 21 and the second antenna trace 22 can be adjusted as long as under the excitation of the second dipole excitation source 20, the second dipole excitation component 21 can perform coupled excitation on the second antenna trace 22. The corresponding working principle is as follows: the second dipole excitation source 20 is loaded on the second dipole excitation component 21, and the radiation slot 11 asserts a binding effect on surrounding electromagnetic fields, which enables the second dipole excitation component 21 to perform coupled excitation on the second antenna trace 22 so that the second antenna trace 22 operates in the dipole antenna mode. Preferably, orthographic projections of the second dipole excitation component 21 and the second antenna trace 22 at least partially overlap, in which case the second dipole excitation component 21 is more effectively coupled to the second antenna trace 22.

As an example, the second dipole excitation source 20 may be a MIMO excitation source, a WLAN excitation source, or a Sub 6G excitation source.

Referring to FIG. 17, as an example, the excitation unit is excited in the direct excitation mode, the slot excitation components 14 extend over the radiation slot 11 in a direction parallel to the narrow sides of the radiation slot 11, and the ends of slot excitation components 14 are connected to the metal ground 10; the slot excitation source 13, the first dipole antenna 15, and the second dipole antenna 19 are all symmetrical with respect to the line connecting the center points of the two narrow sides of the radiation slot (i.e., the line L), thereby minimizing coupling among the three antennas (the slot antenna, the first dipole antenna, and the second dipole antenna 19), and achieving a high degree of isolation among the three. Similarly, when the excitation unit 12 is excited in the coupled excitation mode through a dipole unit, the dipole unit, the first dipole antenna 15, and the second dipole antenna may also be configured to be symmetrical with respect to the line L, respectively, thereby minimizing coupling among the three antennas (the slot antenna, the first dipole antenna, and the second dipole antenna 19), and achieving a high degree of isolation among the three.

As shown in FIG. 17, as an example, the first dipole antenna and the second dipole antenna 19 are spaced apart along the line L, so as to improve the isolation between the first dipole antenna and the second dipole antenna 19.

Figure 28:
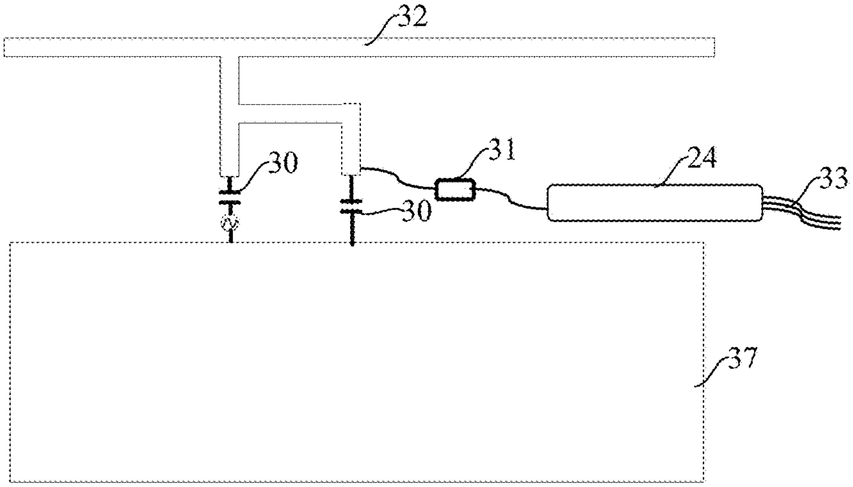
FIG. 28 (prior art)
FIG. 28 shows a schematic diagram of an existing application of a distance sensor/antenna.
Figure 29:
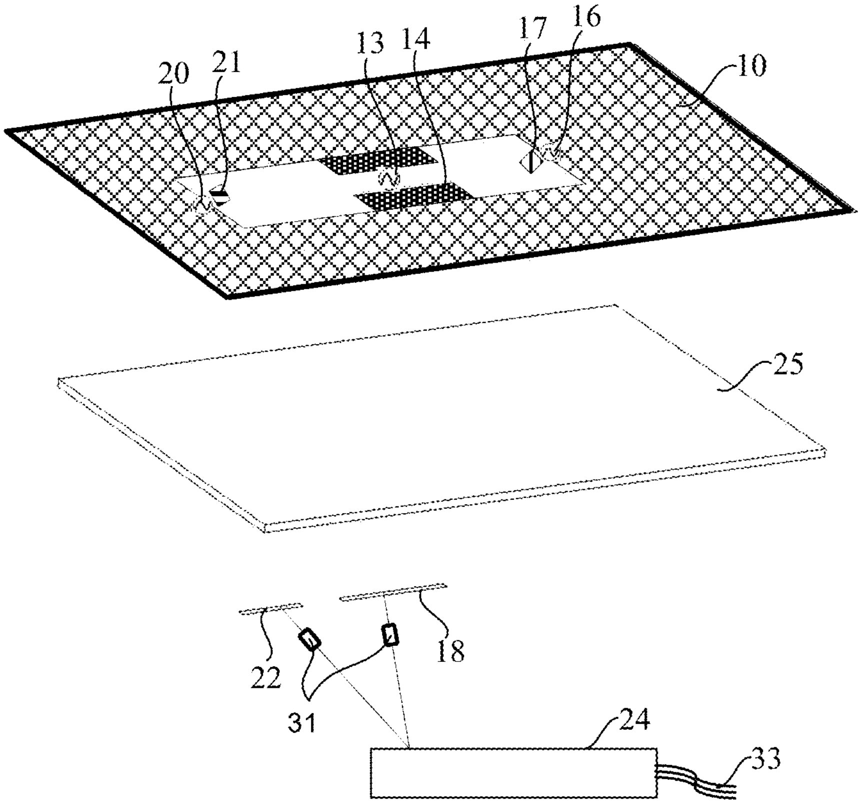
FIG. 29 is a schematic diagram showing antenna traces of a highly integrated multiple antenna configuration functioning as a distance sensor according to one embodiment of the present disclosure.

As an example, the first antenna trace 18 and/or the second antenna trace 22 are used as one or more sensing branches of a distance sensor 24, and therefore the distance sensor 24 can function as both an antenna and a sensor; as shown in FIG. 29, in one example, both the first antenna trace 18 and the second antenna trace 22 are used as sensing branches of the distance sensor 24. FIG. 28 shows a schematic diagram of an existing application of a distance sensor (P-sensor) and antenna. Generally, a completely floating sensing branch of a distance sensor does not have an antenna function, so in order to provide the antenna trace 32 with good sensing sensitivity, a feed point and second dipole a grounding point of the antenna need to be respectively connected to a capacitor 30, in order to make the antenna work in a floating state in a P-sensor operating frequency. When a detection signal line of the distance sensor is connected to the antenna, the detection signal line needs to go through high frequency filtering, usually achieved by introducing an inductor 31 to the detection signal line. In some embodiments of the present disclosure, as shown in FIG. 29, the first antenna trace 18 and the second antenna trace 22 are completely floating, and the first antenna trace 18 and the second antenna trace 22 are used individually or together as one or more sensing branches of the distance sensor, so that the latter can function as both an antenna and a sensor. Compared with traditional distance sensor and antenna applications, the present disclosure eliminates the need to float the antenna traces, which effectively reduces the loss of antenna performance.

Figure 30:
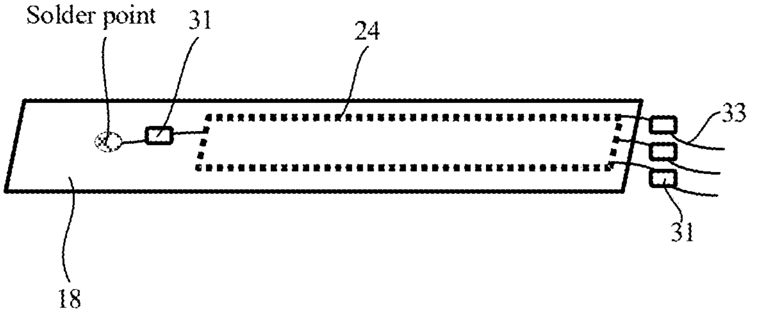
FIG. 30 shows a schematic diagram showing antenna traces of a highly integrated multiple antenna configuration integrated with a distance sensor control circuit to achieve spatial multiplexing according to one embodiment of the present disclosure.

As some other embodiments, it is also possible to integrate the distance sensor 24 on the slot excitation components 14, or on the first antenna trace 18 of the first dipole antenna 15, or on the second antenna trace 22 of the second dipole antenna 19, and the integration of the electronic product can be further improved by simply introducing a high frequency filtering structure (i.e., a structure that filters out high frequency signals, e.g., the inductor 31) between the distance sensor 24 and the element it is to be integrated on, to reduce mutual interference of signals between them. As shown in FIG. 30, in one example, a control circuit area of the distance sensor 24 is integrated on the first antenna trace 18, thereby achieving spatial multiplexing and further improving the integration of the antenna system.

It should be noted here that, without violating the design principle of the present disclosure, the relative positions of the radiation slot 11, excitation unit 12, first dipole antenna 15, and second dipole antenna 19 in the highly integrated antenna configuration can be adjusted according to actual needs. When the corresponding electronic product is a multilayer structure, the above mentioned highly integrated antenna configuration can be located in any one or more layers of the multilayer structure.

In the following, the highly integrated antenna configuration of the present disclosure will be described in detail with attached drawings and corresponding embodiments. The described embodiments are only part of all embodiments of the present disclosure. All other embodiments obtained by a person skilled in the art based on the embodiments in the present disclosure without creative work shall fall within the scope of the present disclosure.

Embodiment 1

Figure 19:
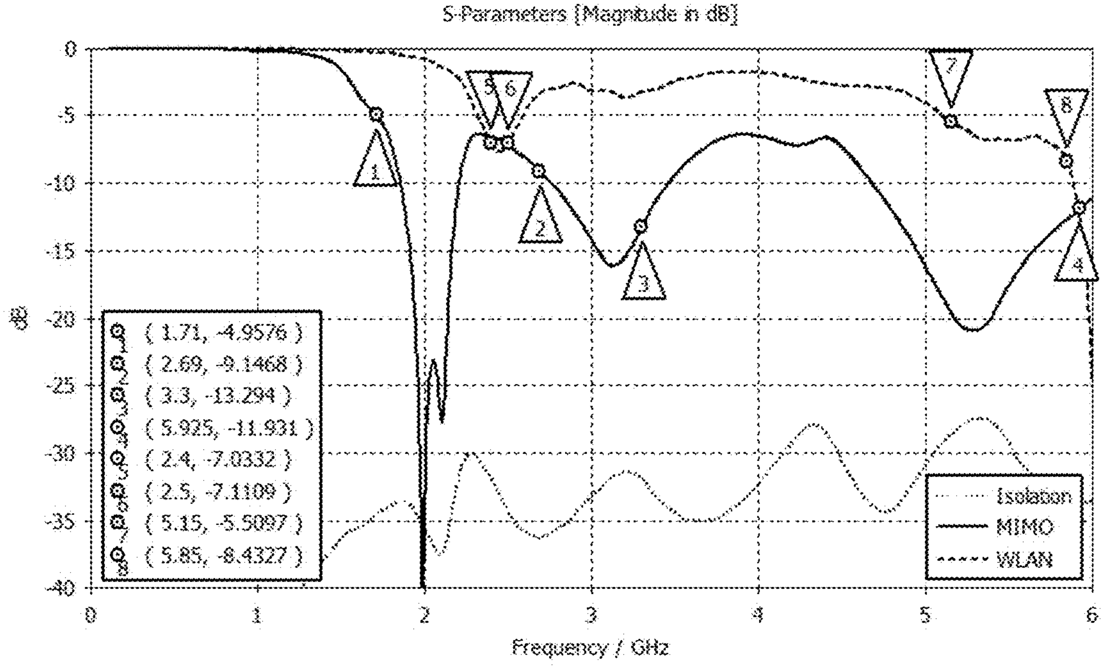
FIG. 19 and FIG. 20 show a simulated S-parameter (isolation and return loss) diagram and a simulated efficiency diagram of Embodiment 1.
Figure 20:
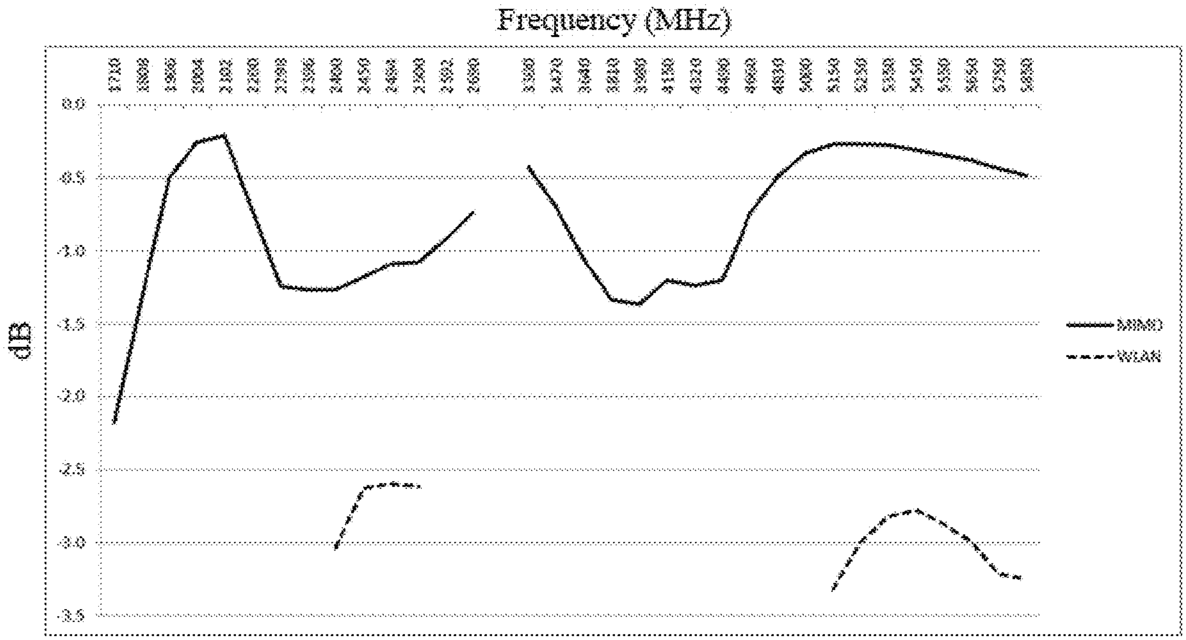

Refer to FIG. 12 and FIG. 18. FIG. 12 is a schematic diagram showing a spatial layout of the slot antenna and the first dipole antenna in FIG. 18, and FIG. 18 depicts a simplified laptop including an upper half 27 and a lower half 28 that are perpendicular to each other and connected by a metal hinge 26. There are usually two metal hinges connecting the upper half 27 and the lower half 28, one on the left, the other on the right. Since the two metal hinges are substantially the same, the present disclosure focuses on one of the metal hinges. The highly integrated antenna configuration of Embodiment 1 is applied to a hinge region (50 mm*15 mm) of the laptop, and the metal ground 10 is formed by the upper half 27, the lower half 28, the metal hinge 26, and an electrical connection structure 29 electrically connecting the upper half 27 and the lower half 28. The radiation slot 11 is formed in the hinge region, the excitation unit 12 disposed in the hinge region is excited in the dipole-coupled-feeding mode, and the slot excitation source 13 of the excitation unit is a MIMO antenna signal source, which is loaded on the slot excitation components 14, so that the slot excitation components 14 excite the hinge region to form the slot antenna, which is a MIMO antenna operating in the frequency band of 1700 MHz to 6000 MHz. In addition, the first dipole antenna 15 placed in the hinge region is excited in the coupled excitation mode, the first dipole excitation source 16 of the first dipole antenna 15 is a WLAN antenna signal source, the WLAN antenna signal source is loaded on the first dipole excitation component 17, and the hinge region asserts a binding effect on surrounding electromagnetic fields, which enables the first dipole excitation component 17 to perform coupled excitation on the first antenna trace 18 so that the first antenna trace 18 operates in the dipole antenna mode. The first dipole antenna 15 is a dual-band WLAN antenna, and operates in the frequency bands of 2400 MHz~2500 MHZ, and 5150 MHz~5850 MHz. The slot excitation components 14 and the first antenna trace 18 are located in different spatial layers, and their orthographic projections at least partially overlap. The two electric fields generated by the slot antenna and the first dipole antenna 15 are orthogonal to each other. This solution takes advantage of structural features of the laptop without additional antenna headroom and maximizes the integrity of the ID design. FIG. 19 and FIG. 20 show a simulated S-parameter (isolation and return loss) diagram and a simulated efficiency diagram of the two antennas. It can be seen from the figures that each of the two antennas covers its own working frequency band(s), and the isolation is better than −25 dB. This embodiment achieves a high isolation dual antenna in a small hinge region of a laptop, which is a new solution for laptop antenna design.

Embodiment 2

Figure 21:
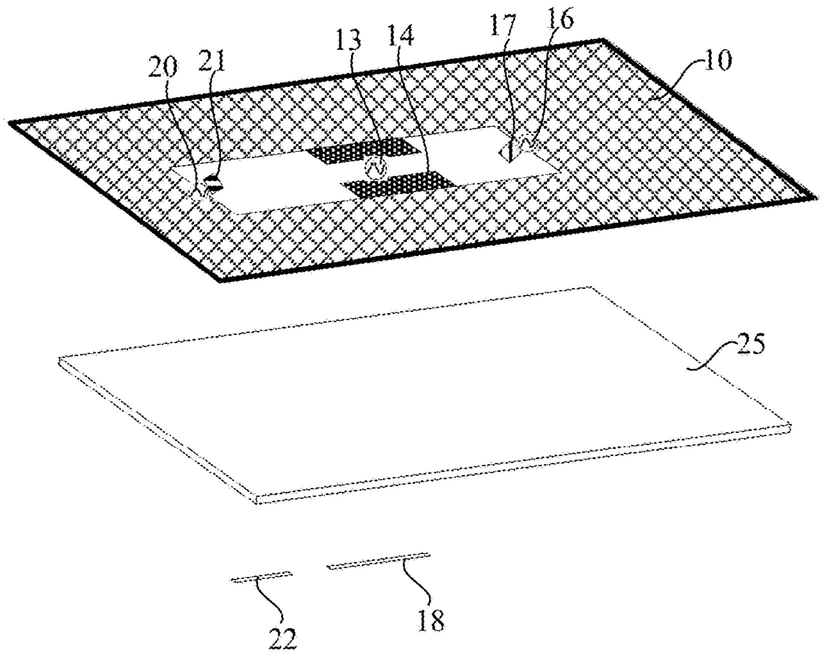
FIG. 21 shows a spatial layout of the three antennas, corresponding to the structural configuration shown in FIG. 17, of Embodiment 2 of the present disclosure.
Figure 22:
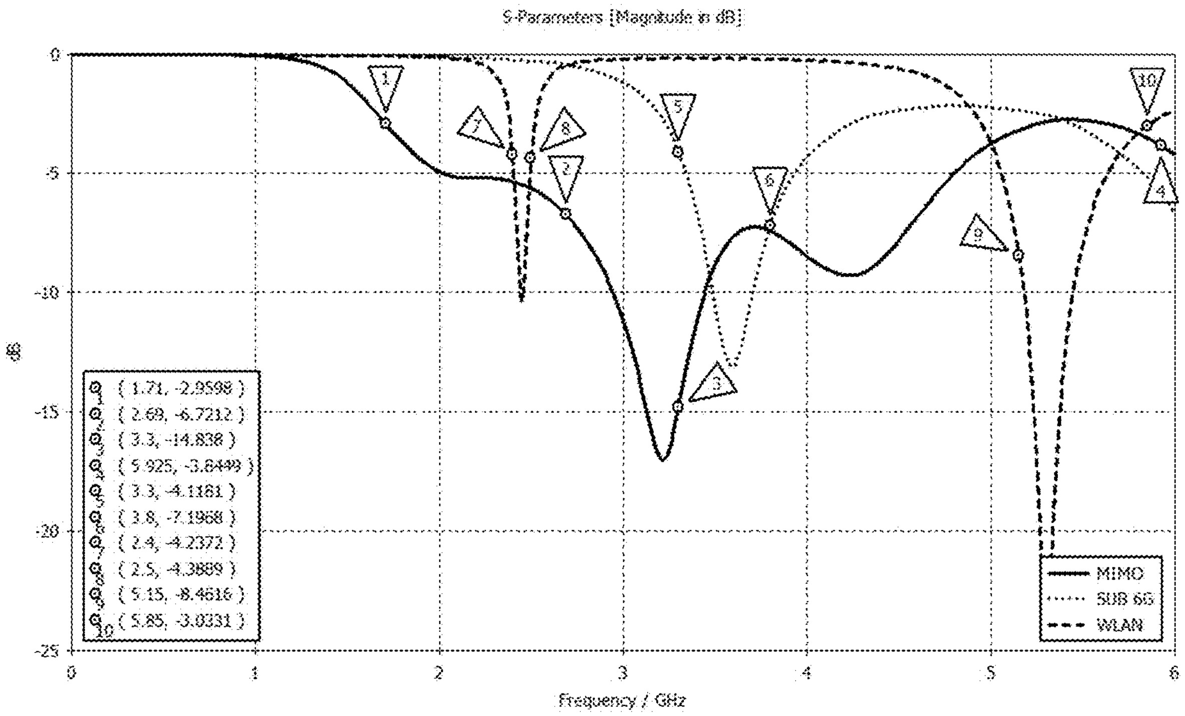
FIG. 22 to FIG. 24 are respectively a simulated return loss parameter diagram, a simulated isolation parameter diagram, and a simulated efficiency diagram of Embodiment 2.
Figure 23:
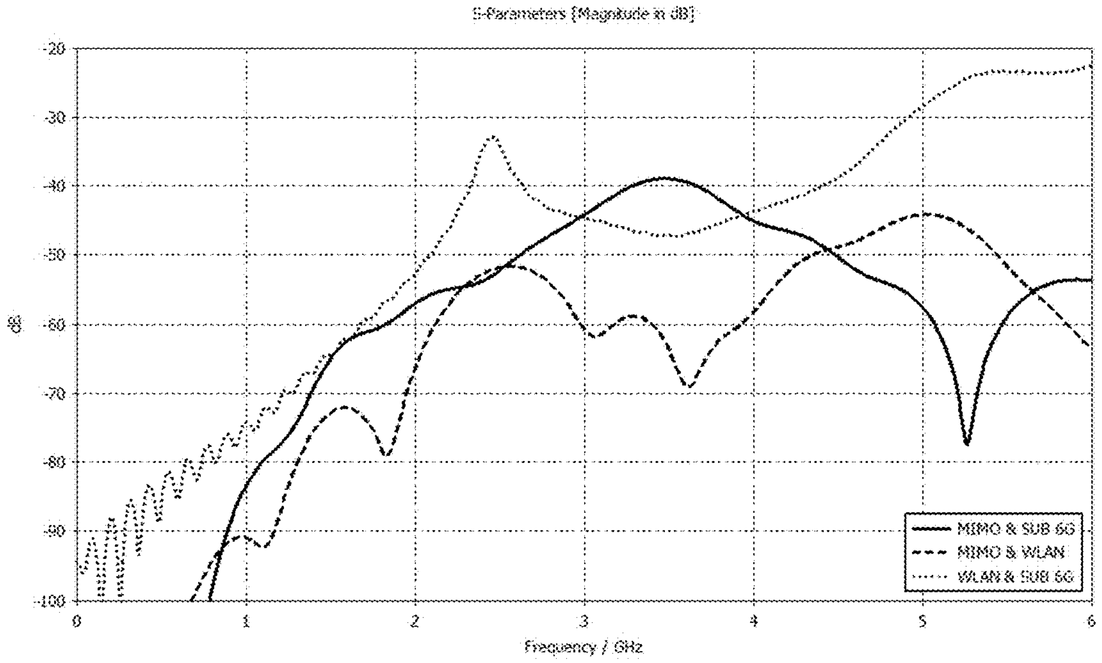
Figure 24:
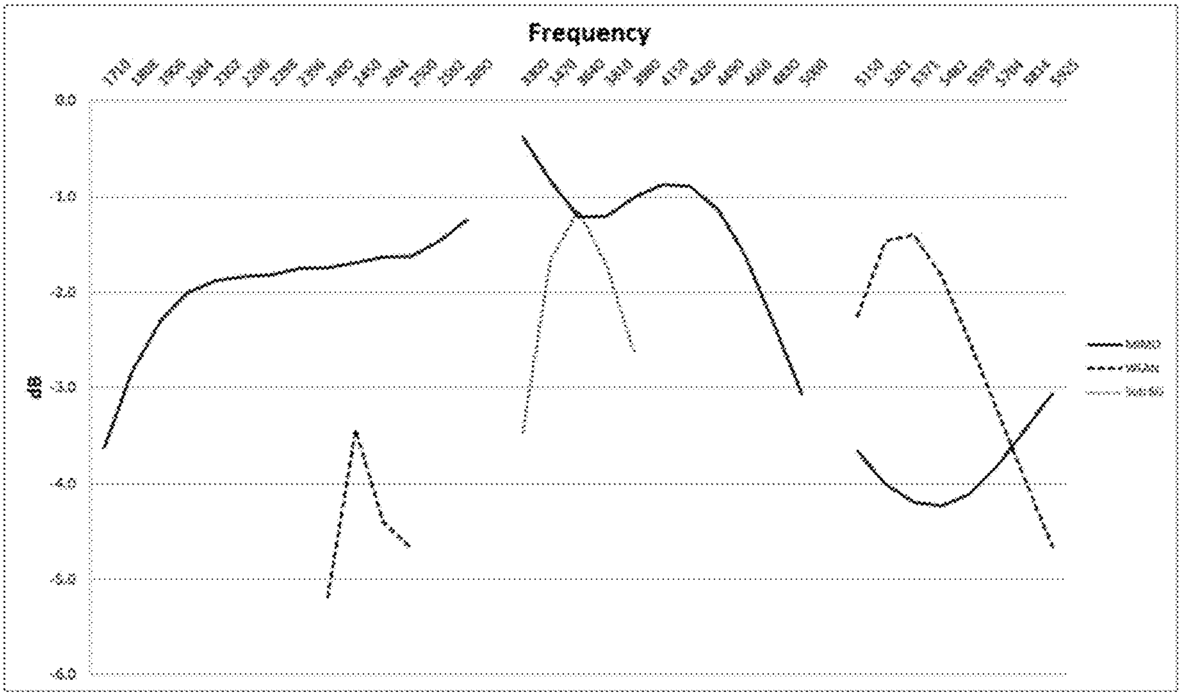
Figure 25:
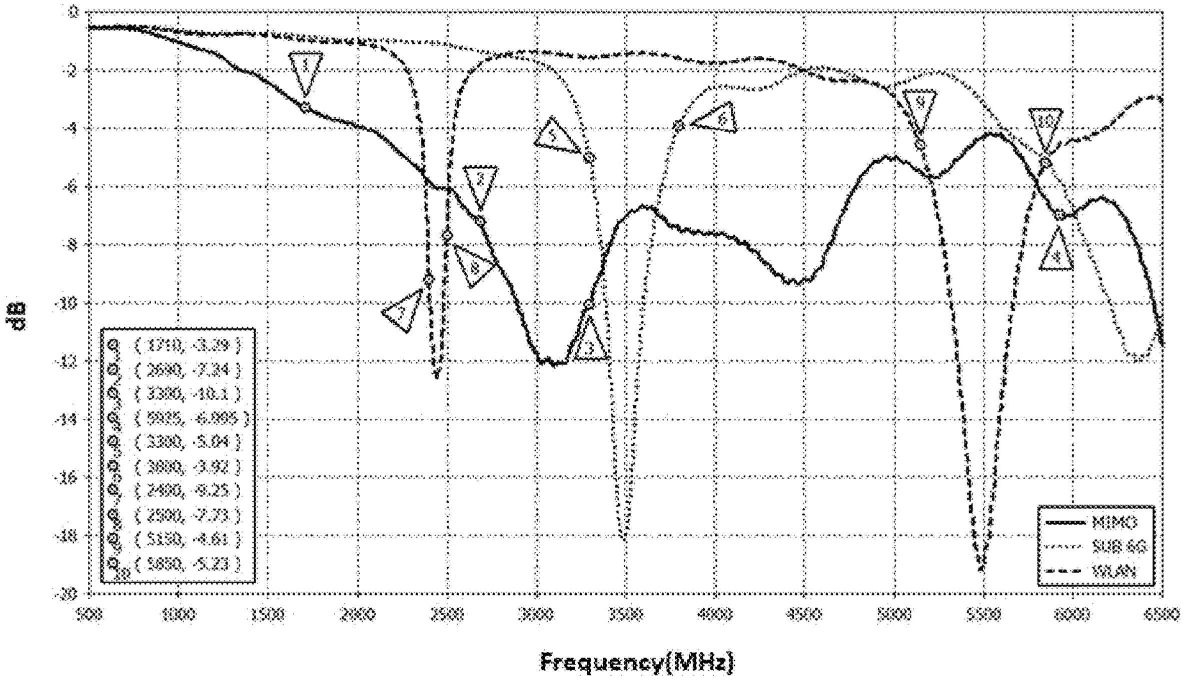
FIG. 25 to FIG. 27 are respectively a measured return loss parameter diagram, a measured isolation parameter diagram, and a measured efficiency diagram of Embodiment 2.
Figure 26:
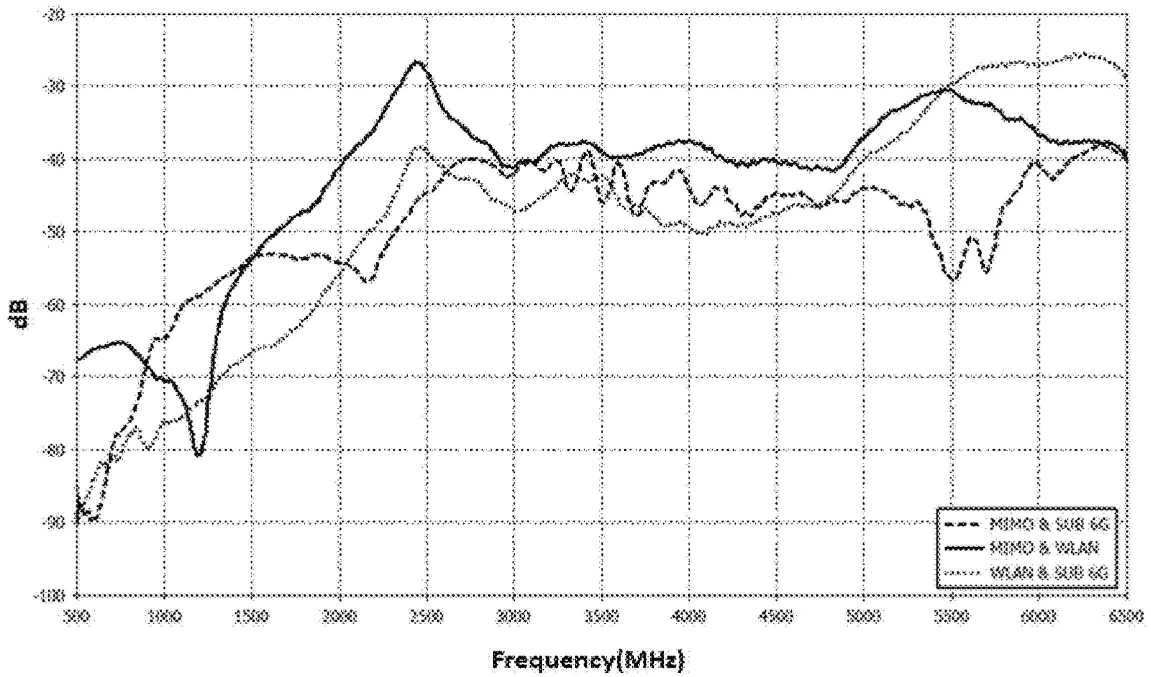
Figure 27:
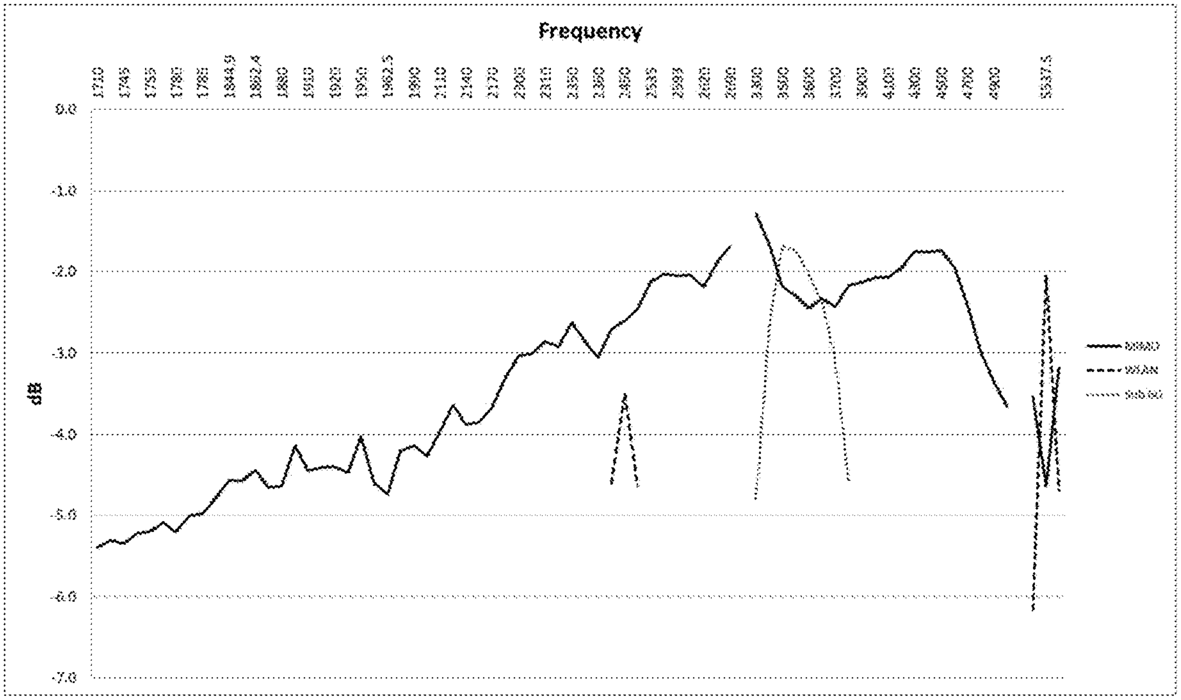

Refer to FIG. 17 and FIG. 21. FIG. 21 is a schematic diagram showing a spatial layout of the slot antenna, the first dipole antenna, and the second dipole antenna in FIG. 17. The electric field generated by the slot antenna is orthogonal to the one generated by the first dipole antenna and the one generated by the second dipole antenna, respectively. The dimensions of the radiation slot 11 in one example are 60 mm*15 mm*2 mm, the excitation unit (including the slot excitation source 13 and the slot excitation components 14) placed inside the radiation slot 11 is excited in the direct feeding mode, the slot excitation source 13 of the excitation unit is a MIMO antenna signal source, and the MIMO antenna signal source is loaded on the slot excitation components 14, so that the slot excitation components 14 excite the radiation slot 11, thereby forming the slot antenna; the slot antenna is a MIMO antenna with a working frequency band of 1700 MHZ~6000 MHz; the MIMO antenna signal source is located in the middle of the slot excitation components 14 (e.g., between two slot excitation components 14) to obtain the best isolation. The first dipole antenna (including the first dipole excitation source 16 and the first dipole excitation component 17) is placed on the right in the radiation slot 11, and is excited in the coupled excitation mode. The first dipole excitation source 16 of the first dipole antenna is a WLAN antenna signal source, and the WLAN antenna signal source is loaded on the first dipole excitation component 17. The radiation slot 11 asserts a binding effect on surrounding electromagnetic fields, which enables the first dipole excitation component 17 to perform coupled excitation on the first antenna trace 18 so that the first antenna trace 18 operates in the dipole antenna mode. The first dipole antenna is a dual-band WLAN antenna, and operates in the frequency bands of 2400 MHz~2500 MHz, and 5150 MHz~5850 MHz. The slot excitation components 14 and the first antenna trace 18 are located in different spatial layers, and their orthographic projections at least partially overlap. The second dipole antenna 19 is placed on the left in the radiation slot 11, and is excited in the coupled excitation mode. The second dipole excitation source 20 is a Sub 6G antenna signal source, and is loaded on the second dipole excitation component 21. The radiation slot 11 asserts a binding effect on surrounding electromagnetic fields, which enables the second dipole excitation component 21 to perform coupled excitation on the second antenna trace 22 so that the second antenna trace 22 operates in the dipole antenna mode. The second dipole antenna is an antenna operating in the frequency band of 3300 MHz~3800 MHz. FIG. 22 to FIG. 24 are respectively a simulated return loss parameter diagram, a simulated isolation parameter diagram, and a simulated efficiency diagram of the three antennas of Embodiment 2 (i.e., the slot antenna, the first dipole antenna, and the second dipole antenna). It can be seen from the figures that each of the three antennas covers its own working frequency band(s), and the isolation is better than −25 dB. FIG. 25 to FIG. 27 are respectively a measured return loss parameter diagram, a measured isolation parameter diagram, and a measured efficiency diagram of the three antennas (i.e., the slot antenna, the first dipole antenna, and the second dipole antenna). It can be seen from the above two sets of figures that the measured results are consistent with the simulated results.

Embodiment 3

Figure 31:
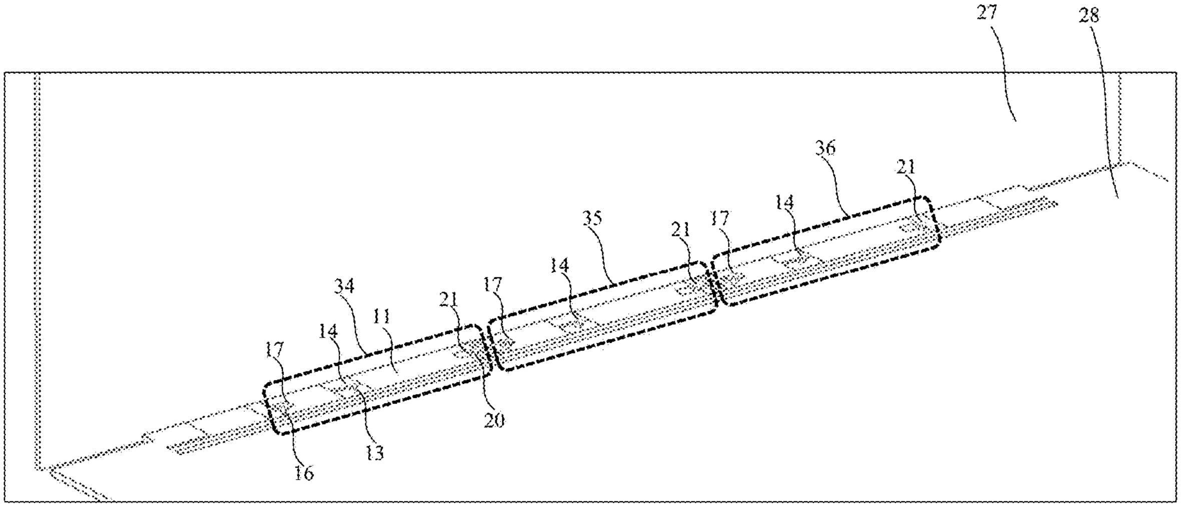
FIG. 31 shows a schematic structural diagram of an antenna module formed based on a high-integrity antenna configuration of Embodiment 3, as applied to a laptop.
Figure 32:
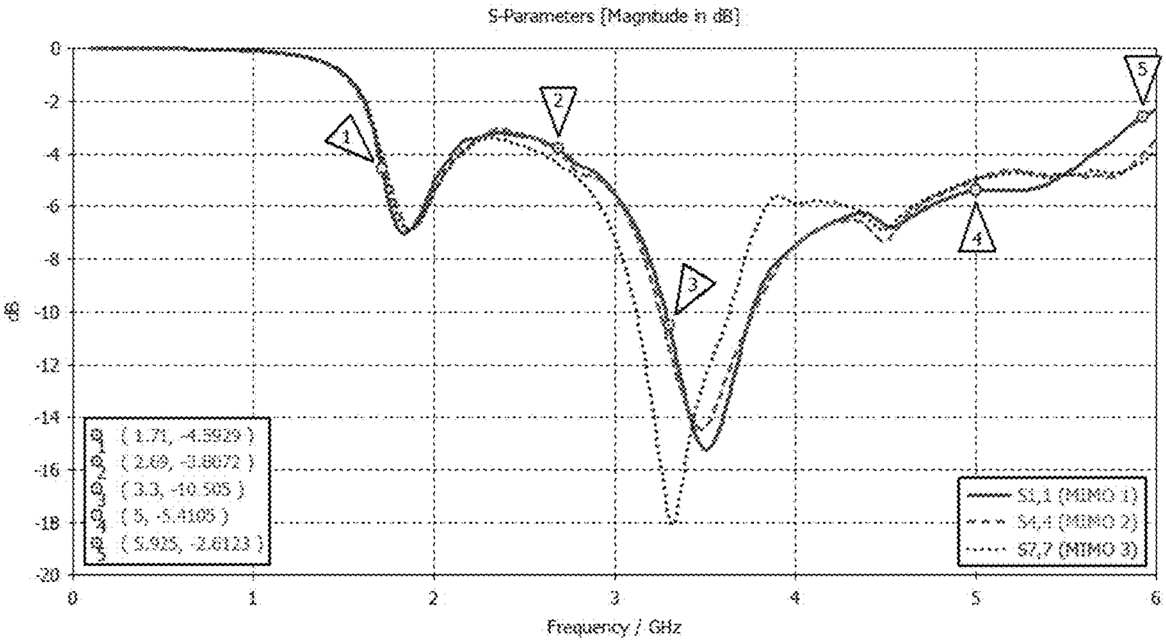
FIG. 32 to FIG. 36 are respectively a simulated return loss parameter diagram, a simulated isolation parameter diagram, and a simulated efficiency diagram of Embodiment 3.
Figure 33:
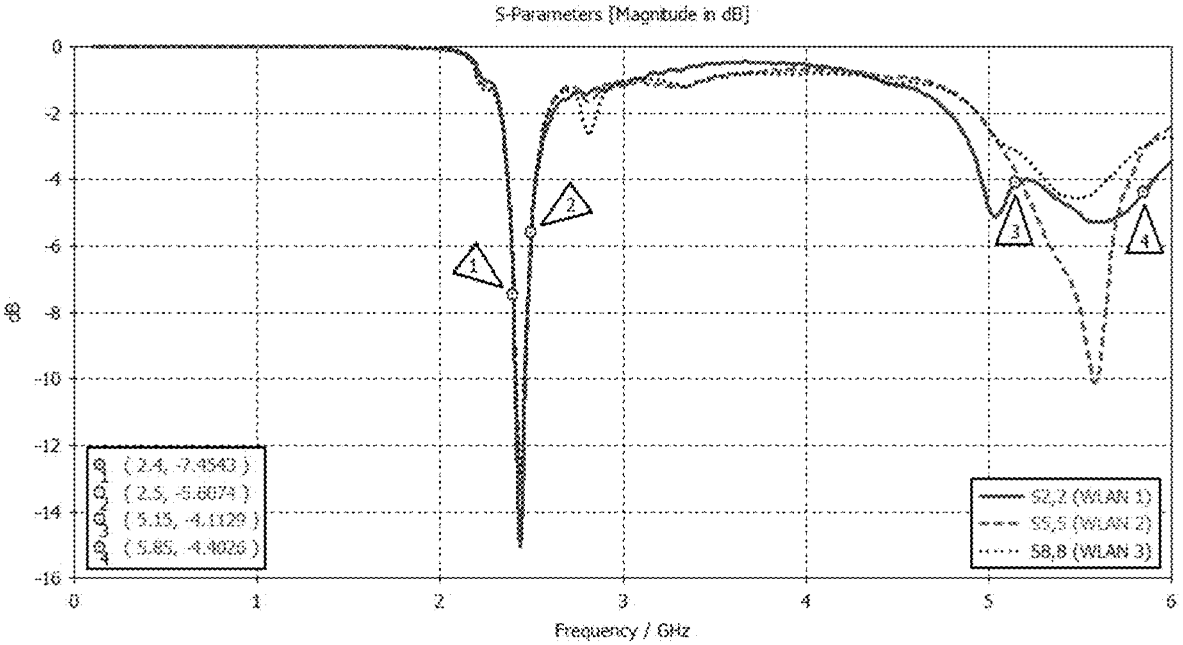
Figure 34:
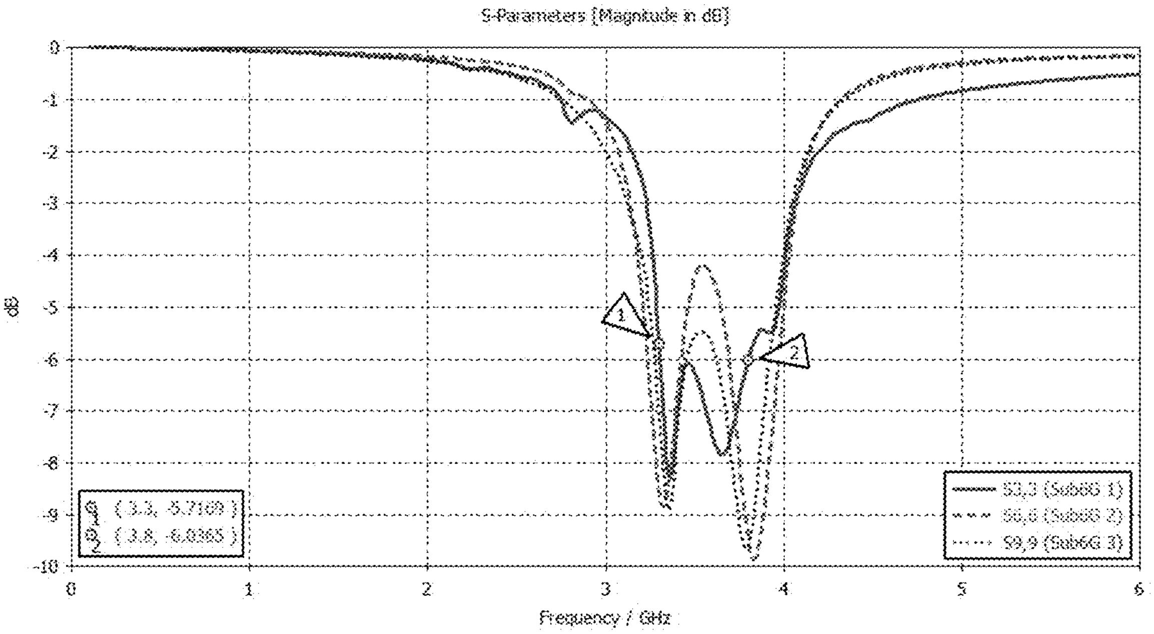
Figure 35:
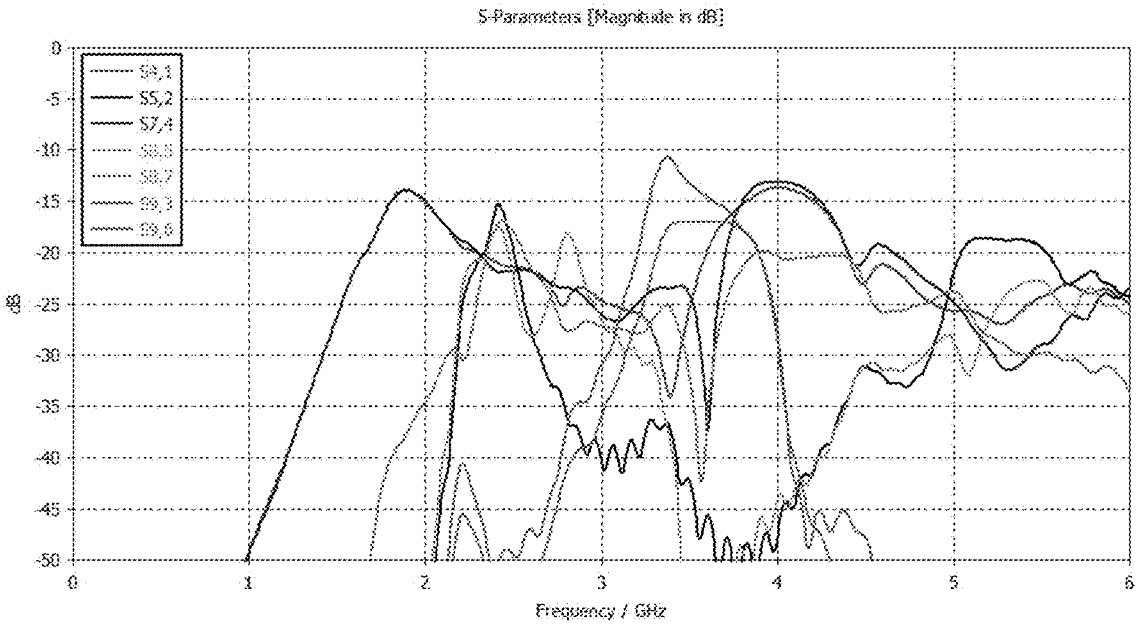
Figure 36:
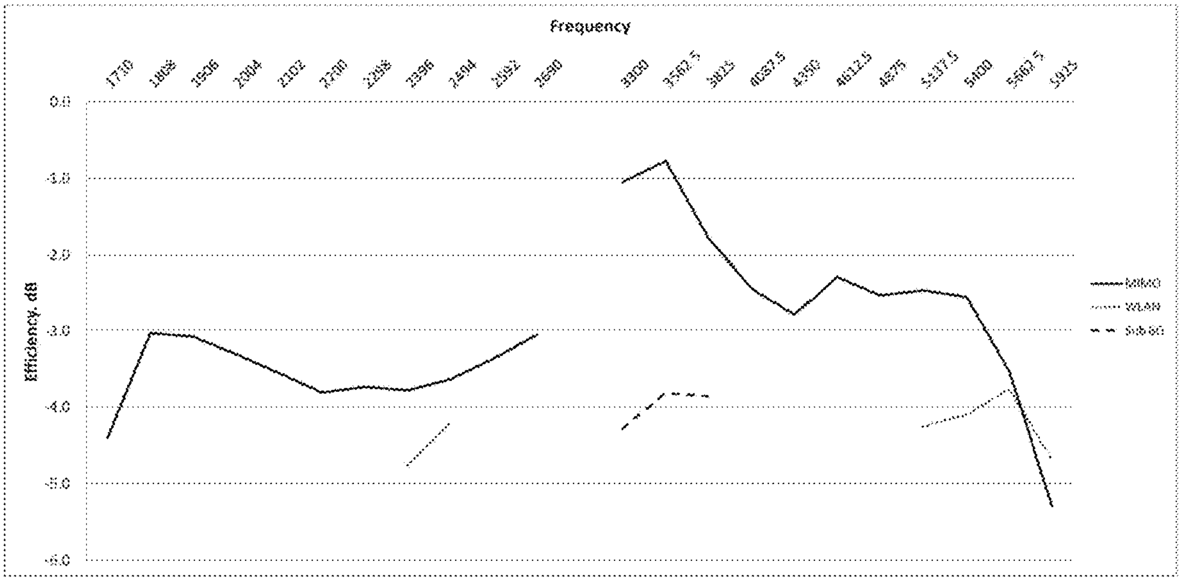

FIG. 31 shows a simplified laptop model, with the upper half 27 and lower half 28 of the laptop substantially perpendicular to each other. By applying the multi-antenna configuration of Embodiment 2 to the middle hinge region of the laptop, an antenna module based on the highly integrated multi-antenna configuration of Embodiment 2 can be obtained. Specifically, at least two highly integrated multi-antenna configurations, each being the one described in Embodiment 2, can be integrated in the hinge region of the laptop to form an antenna module. For example, FIG. 31 shows three highly integrated multi-antenna configurations: a first multi-antenna configuration 34, a second multi-antenna configuration 35, and a third multi-antenna configuration 36; in one example, dimensions of each multi-antenna configuration are 55 mm*10 mm*1.5 mm; each multi-antenna configuration contains three antennas (MIMO, WLAN, Sub 6G), which means a total of nine antennas can be integrated in the hinge region, forming a nine-antenna system. As shown in FIG. 31, the excitation unit placed inside the radiation slot 11 of the first multi-antenna configuration 34 is excited in the direct feeding mode, the slot excitation source 13 of the excitation unit is a MIMO antenna signal source, and the MIMO antenna signal source is loaded on the corresponding slot excitation components 14, so that the slot excitation components 14 excite the corresponding radiation slot 11, thereby forming a slot antenna; the slot antenna is a MIMO antenna with a working frequency band of 1700 MHz~ 6000 MHz; the MIMO antenna signal source is located in the middle of the slot excitation components 14 (e.g., between two slot excitation components 14) to obtain the best isolation. The first dipole antenna (including the first dipole excitation source 16 and the first dipole excitation component 17) is placed on the left in the radiation slot 11 of the first multi-antenna configuration 34, and is excited in the coupled excitation mode. The first dipole excitation source 16 of the first dipole antenna is a WLAN antenna signal source. The first dipole antenna is a dual-band WLAN antenna, and operates in the frequency bands of 2400 MHz~2500 MHZ, and 5150 MHz~5850 MHz. The second dipole antenna (including the second dipole excitation source 20 and the second dipole excitation component 21) is placed on the right in the radiation slot 11 of the first multi-antenna configuration 34, and is excited in the coupled excitation mode. The second dipole excitation source 20 is a Sub 6G antenna signal source. The second dipole antenna is an antenna operating in the frequency band of 3300 MHz~3800 MHZ. As an example, layouts of the second multi-antenna configuration and the third multi-antenna configuration may be the same as that of the first multi-antenna configuration. FIG. 32 to FIG. 34 are simulated return loss parameter diagrams of MIMO, WLAN, and Sub 6G antennas of FIG. 31. FIG. 35 presents some worse isolation results (each curve corresponding to a pair of two antennas), and it can be seen that the worst isolation is still better than −10 dB. FIG. 36 shows simulated efficiency curves of three antennas of the first multi-antenna configuration 34. The simulated results show that the three antennas' performance satisfies basic working indicators.

Embodiment 4

Figure 37:
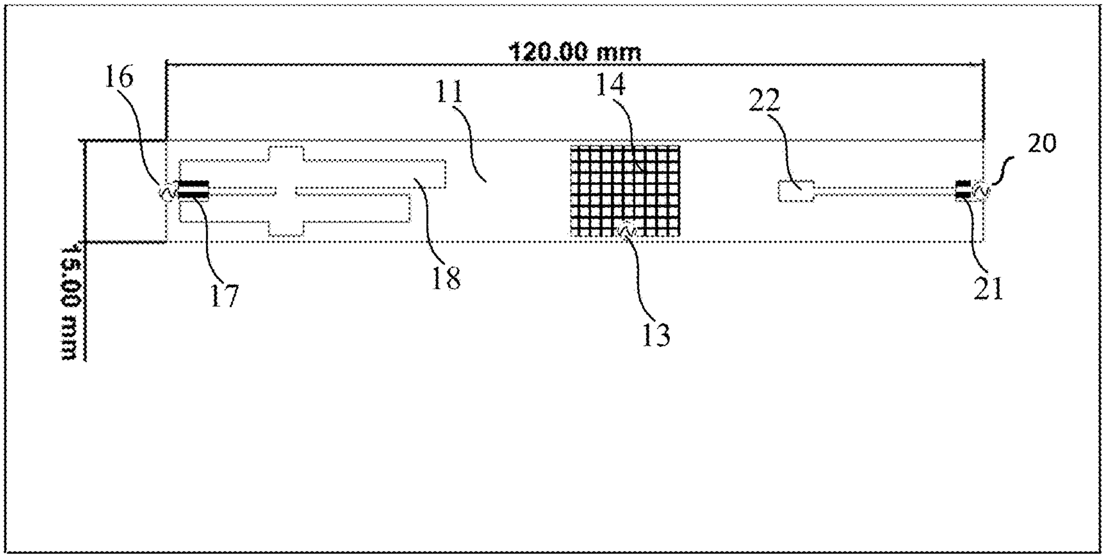
FIG. 37 shows a schematic diagram of a highly integrated antenna configuration of Embodiment 4, including a WWAN antenna, a MIMO antenna, and a WLAN antenna.
Figure 38:
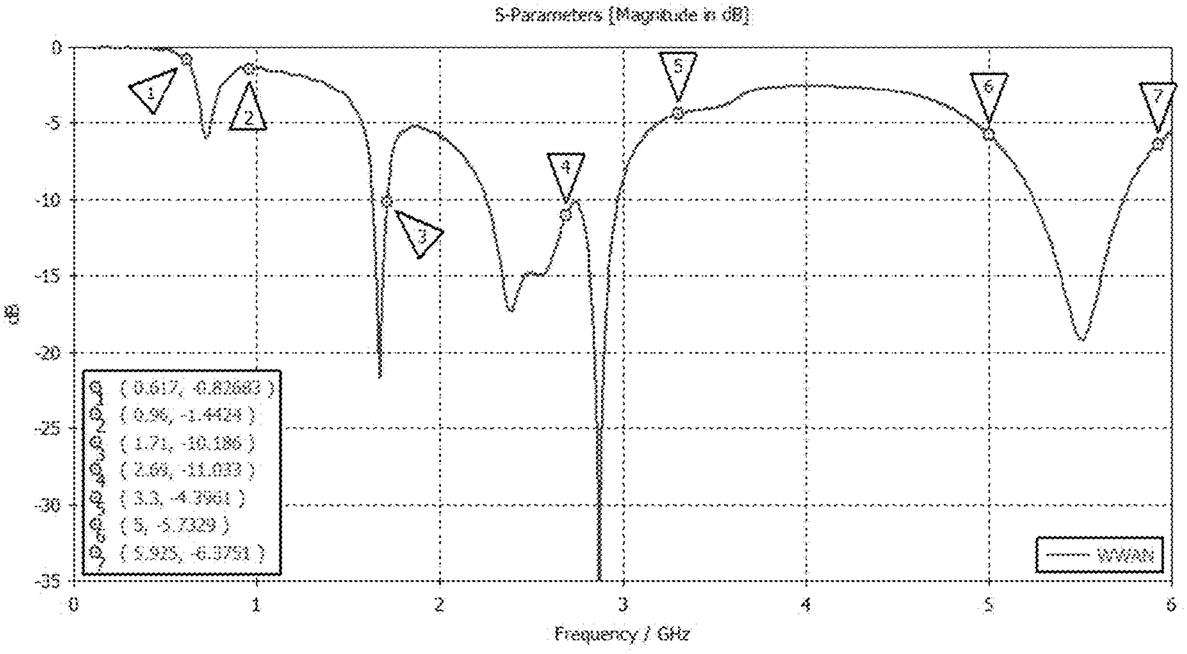
FIG. 38 to FIG. 41 are respectively a simulated return loss parameter diagram, a simulated isolation parameter diagram, and a simulated efficiency diagram of Embodiment 4.
Figure 39:
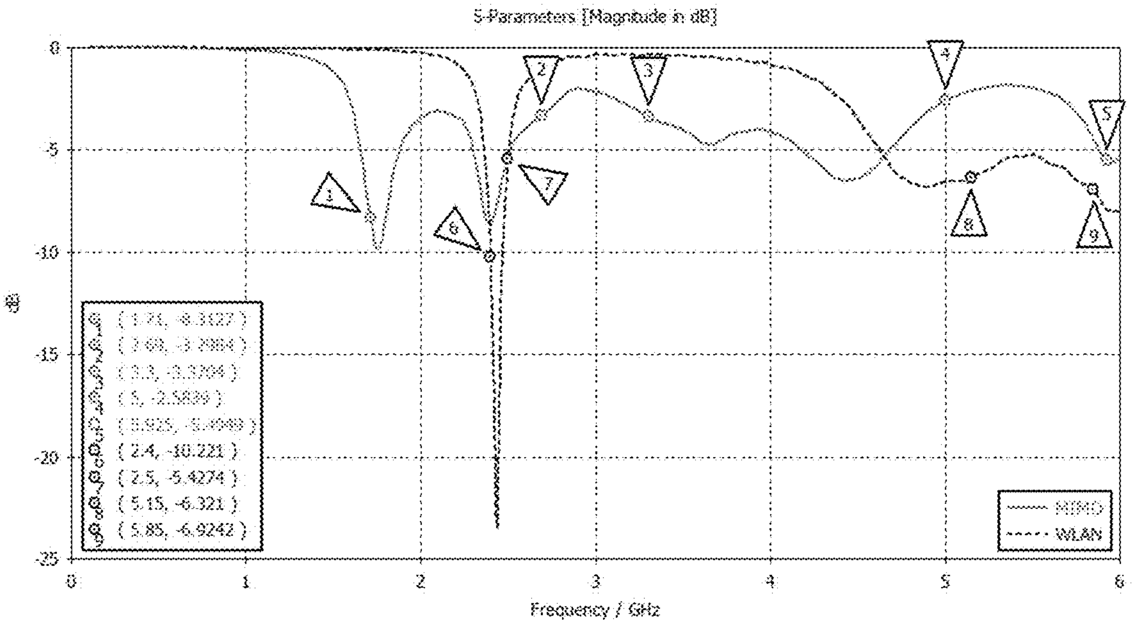
Figure 40:
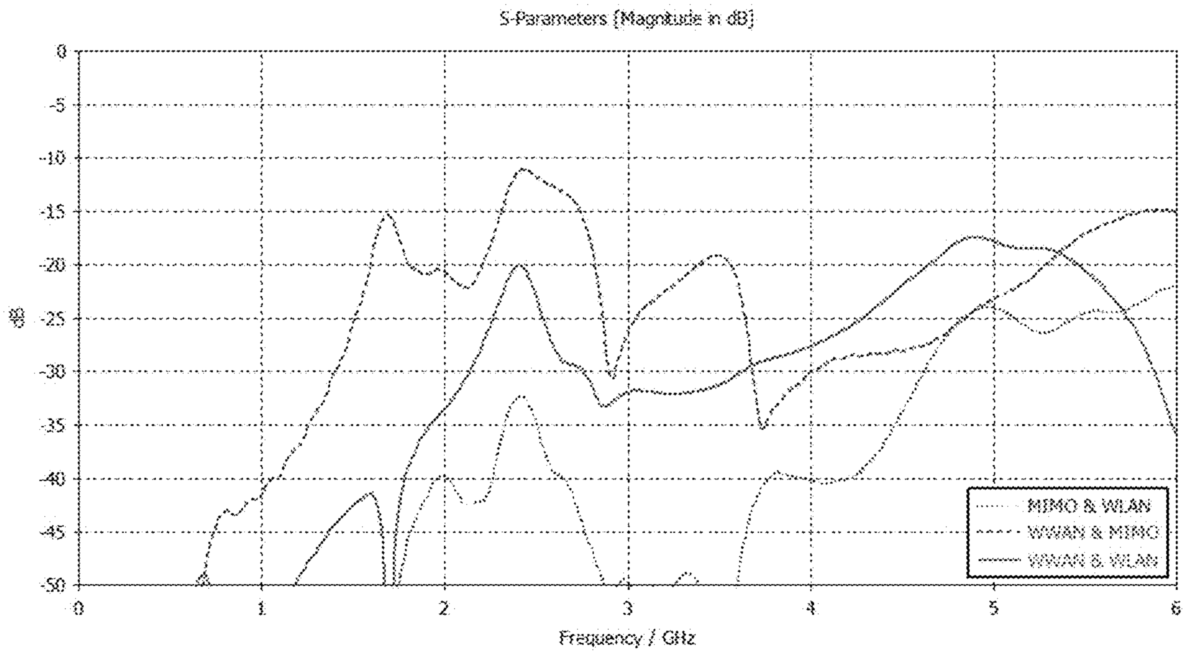
Figure 41:
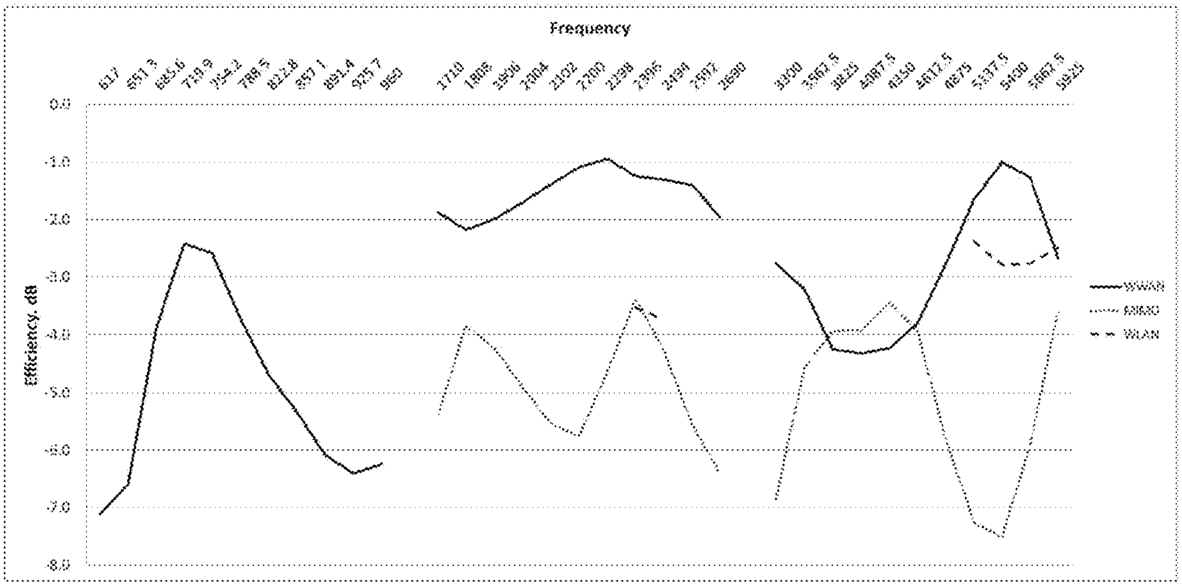

FIG. 37 shows a specific embodiment applying the present disclosure to WWAN, MIMO, and WLAN antennas. The dimensions of the radiation slot 11 in one example are 120 mm*15 mm*2 mm, the excitation unit (including the slot excitation source 13 and the slot excitation component 14) placed inside the radiation slot 11 is excited in the monopole-coupled-feeding mode, the slot excitation source 13 of the excitation unit is a WWAN antenna signal source, and the WWAN antenna signal source is loaded on the slot excitation component 14, so that the slot excitation component 14 excites the radiation slot 11, thereby forming the slot antenna; the slot antenna is a WWAN antenna with a working frequency band of 600 MHz~6000 MHz. The first dipole antenna (including the first dipole excitation source 16 and the first dipole excitation component 17) is placed on the left in the radiation slot 11, and is excited in the coupled excitation mode. The first dipole excitation source 16 of the first dipole antenna is a MIMO antenna signal source, and the MIMO antenna signal source is loaded on the first dipole excitation component 17. The radiation slot 11 asserts a binding effect on surrounding electromagnetic fields, which enables the first dipole excitation component 17 to perform coupled excitation on the first antenna trace 18. The first dipole antenna operates in the frequency band of 1700 MHz~6000 MHz. The second dipole antenna (including the second dipole excitation source 20 and the second dipole excitation component 21) is placed on the right in the radiation slot 11, and is excited in the coupled excitation mode. The second dipole excitation source 20 is a WLAN antenna signal source, and is loaded on the second dipole excitation component 21. The radiation slot 11 asserts a binding effect on surrounding electromagnetic fields, which enables the second dipole excitation component 21 to perform coupled excitation on the second antenna trace 22. The second dipole antenna is a dual-band WLAN antenna, and operates in the frequency bands of 2400 MHZ~2500 MHZ, and 5150 MHz~5850 MHz, FIG. 38 to FIG. 41 are respectively a simulated return loss parameter diagram, a simulated isolation parameter diagram, and a simulated efficiency diagram of the three antennas of Embodiment 4 (i.e., the slot antenna, the first dipole antenna, and the second dipole antenna). It can be seen from the figures that each of the three antennas covers its own working frequency band(s), and the isolation is better than −10 dB, which satisfies basic working indicators. Other than the hinge region of the laptop, the radiation slot in this embodiment can be also an open window area above the keyboard of the laptop.

It should be noted that the above four embodiments only show a few forms among many design options based on the present disclosure; other combinations of antennas (including one or more of the slot antennas, the first dipole antenna and the second dipole antenna) may also be applied to the above embodiments. Different combinations of antennas may lead to different degrees of isolation, and selection can be made according to specific needs. Performance and dimensions of the antennas in the above 4 embodiments may be further optimized, and their operating frequency bands can be further expanded to include WiFi-6, UWB, etc. Any optimization of the antennas by means of matching, switching, etc. is a variation of the present disclosure.

In summary, the present disclosure provides a highly integrated multi-antenna configuration and an antenna module containing the multi-antenna configuration. Based on the same radiation slot in the slot antenna, several multi-antenna configurations are formed, which can be applied to antenna designs such as 2G, 3G, 4G, 5G, BT, Wi-Fi, Navigation, and UWB, depending on the size of the radiation slot; in actual implementations, antenna traces can also be integrated with a distance sensor to achieve dual functionality or spatial multiplexing, thereby further improving the integration of the antenna system. Meanwhile, by controlling the electric field generated by the first dipole antenna to be orthogonal to the electric field generated by the slot antenna, a high isolation between the two antennas can be achieved, thereby increasing the isolation between the two antennas while improving the antenna integration. Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A highly integrated multi-antenna configuration, comprising:

a metal ground; a radiation slot cut out of a surface of the metal ground; and an excitation unit; wherein the excitation unit comprises a slot excitation source and slot excitation components, and the slot excitation source is loaded on the slot excitation components to excite the radiation slot, thereby forming a slot antenna; and a first dipole antenna, disposed in the radiation slot, wherein the first dipole antenna comprises a first dipole excitation source and a first antenna trace, and the first antenna trace extends along a direction that is at an angle of between −10° and 10° with a long side of the radiation slot;

wherein the first dipole antenna is excited in a coupled excitation mode, the first dipole antenna further comprises a first dipole excitation component connected to the first dipole excitation source, the first dipole excitation source is loaded on the first dipole excitation component, and the radiation slot asserts a binding effect on surrounding electromagnetic fields, which enables the first dipole excitation component to perform coupled excitation on the first antenna trace so that the first antenna trace operates in a dipole antenna mode.

2. The highly integrated multi-antenna configuration according to claim 1, wherein the metal ground comprises a PCB board, an FPC board, a metal housing, or a conductive metal coating.

3. The highly integrated multi-antenna configuration according to claim 1, wherein the excitation unit is excited in a direct excitation mode or a coupled excitation mode.

4. The highly integrated multi-antenna configuration according to claim 3, wherein the excitation unit is excited by coupled feeding through a dipole unit, and the dipole unit comprises a Balun structure.

5. The highly integrated multi-antenna configuration according to claim 3, wherein the excitation unit is excited in the direct excitation mode, the slot excitation components extend over the radiation slot in a direction parallel to a narrow side of the radiation slot, ends of slot excitation components are connected to the metal ground, and both the slot excitation source and the first dipole antenna are symmetrical with respect to a line connecting center points of two narrow sides of the radiation slot, respectively; or the excitation unit is excited in the coupled excitation mode through a dipole unit, and both the dipole unit and the first dipole antenna are symmetrical with respect to the line connecting the center points of the two narrow sides of the radiation slot, respectively.

6. The highly integrated multi-antenna configuration according to claim 1, wherein the first dipole antenna is excited in a direct excitation mode, and the first dipole excitation source is directly loaded on the first antenna trace.

7. The highly integrated multi-antenna configuration according to claim 1, wherein the slot excitation components and the first antenna trace are located in different spatial layers, and their orthographic projections onto one of the spatial layers at least partially overlap.

8. The highly integrated multi-antenna configuration according to claim 1, wherein the excitation unit is excited in a coupled excitation mode, the slot excitation components comprise a first slot excitation component and a second slot excitation component, with the first slot excitation component connected to the slot excitation source, the first slot excitation component and the second slot excitation component are located in different spatial layers, and the slot excitation source is loaded on the first slot excitation component, which enables the first slot excitation component to performed coupled excitation on the second slot excitation component.

9. The highly integrated multi-antenna configuration according to claim 1, wherein the radiation slot is a closed slot whose four sides are enclosed by the metal ground, or the radiation slot is an open slot partially enclosed by the metal ground, and has an opening located on a narrow side of the radiation slot.

10. The highly integrated multi-antenna configuration according to claim 1, further comprising a second dipole antenna provided in the radiation slot, wherein the second dipole antenna comprises a second dipole excitation source and a second antenna trace, and the second antenna trace extends in a direction that is at an angle of between −10° and 10° with the long side of the radiation slot.

11. The highly integrated multi-antenna configuration according to claim 10, wherein the excitation unit is excited in a direct excitation mode, the slot excitation components extend over the radiation slot in a direction parallel to a narrow side of the radiation slot, and ends of slot excitation components are connected to the metal ground, wherein the slot excitation source, the first dipole antenna, and the second dipole antenna are all symmetrical with respect to a line connecting center points of two narrow sides of the radiation slot; or the excitation unit is excited in a coupled excitation mode through a dipole unit, wherein the dipole unit, the first dipole antenna, and the second dipole antenna are all symmetrical with respect to the line connecting the center points of the two narrow sides of the radiation slot.

12. The highly integrated multi-antenna configuration according to claim 10, wherein the second dipole antenna is excited in a coupled excitation mode, the second dipole antenna further comprises a second dipole excitation component connected to the second dipole excitation source, the second dipole excitation source is loaded on the second dipole excitation component, and the radiation slot asserts a binding effect on surrounding electromagnetic fields, which enables the second dipole excitation component to perform coupled excitation on the second antenna trace so that the second antenna trace operates in a dipole antenna mode.

13. The highly integrated multi-antenna configuration according to claim 10, wherein the first antenna trace and/or the second antenna trace act as one or more sensing branches of a distance sensor.

14. The highly integrated multi-antenna configuration according to claim 10, wherein through a high frequency filtering structure, the distance sensor is connected to the slot excitation components, or the first antenna trace, or the second antenna trace.

15. The highly integrated multi-antenna configuration according to claim 10, wherein the second dipole excitation source is a MIMO excitation source, a WLAN excitation source, or a Sub 6G excitation source.

16. The highly integrated multi-antenna configuration according to claim 1, wherein the slot excitation source is a WWAN excitation source, a MIMO excitation source, a WLAN excitation source, or a Sub 6G excitation source, the first dipole excitation source is a MIMO excitation source, a WLAN excitation source, or a Sub 6G excitation source.

17. An antenna module, comprising two or more highly integrated multi-antenna configurations, each being the highly integrated multi-antenna configuration as claimed in claim 1.

* * * * *